United States Patent [19]

Foulkes

[11] 4,037,630
[45] * July 26, 1977

[54] MANUFACTURE OF BATTERY PLATES

[75] Inventor: Stanley Charles Foulkes, Bolton, England

[73] Assignee: Chloride Group Limited, London, England

[*] Notice: The portion of the term of this patent subsequent to May 3, 1994, has been disclaimed.

[21] Appl. No.: 623,897

[22] Filed: Oct. 20, 1975

[30] Foreign Application Priority Data

Oct. 18, 1974 United Kingdom ............... 45241/74
Dec. 23, 1974 United Kingdom ............... 55500/74

[51] Int. Cl.² ........................................... H01M 4/82
[52] U.S. Cl. .................................................. 141/1.1
[58] Field of Search ..................... 136/67, 27, 43; 429/225; 141/1.1

[56] References Cited

U.S. PATENT DOCUMENTS

| 2,551,301 | 6/1951 | Chubb | 136/27 X |
| 3,228,796 | 1/1966 | Barak et al. | 136/67 |
| 3,462,305 | 8/1969 | Fahrbach | 136/43 X |
| 3,542,600 | 11/1970 | Pohlmann | 136/67 X |
| 3,885,988 | 5/1975 | Bohle | 136/27 |

Primary Examiner—C. F. Lefevour
Attorney, Agent, or Firm—Oblon, Fisher, Spivak, McClelland & Maier

[57] ABSTRACT

There is disclosed a method for preparing enveloped plates for batteries by introducing an active material composition containing liquids into the porous envelope of the plate, when the envelope is assembled on the current conducting element of the plate using an active material composition with a liquid content such that active material is filtered out by the porous envelope, and a bed of active material is built up in the envelope, the bed building up from the end remote from that at which the composition is introduced back to the end at which the composition is introduced, liquid issuing through the walls of the envelope throughout the period that the bed is being built up.

A variety of suitable active material compositions are described together with apparatus suitable for carrying out the method.

30 Claims, 18 Drawing Figures

MANUFACTURE OF BATTERY PLATES

This invention relates to the manufacture of battery plates especially those of tubular type and is concerned in particular with the filling of the tubes of such plates, novel apparatus for carrying out the method and novel active material paste composition.

Tubular plates can have a variety of different types of tube material and tube configurations and can have tubes joined together or formed as separate tubes which are separately located on the spines.

One example of such separate tube arrangements utilizes woven fabric tubes having a thin outer plastic sheath provided with perforations about 1 -2 mm across spaced apart by about 1 to 2 mms. The plastic sheath is about 0.1 to 0.2 mms thick.

The invention, though not limited to such arrangements, however, is described with particular reference to tube arrangements in which the tubes are a single preformed assembly since this facilitates assembly of the tubes onto the spines of the plate.

A conventional method for making tubular plates involves impregnating fabric tubes with a resin to render them stiff though still permeable, locating the tubes on an array of lead alloy spines, one spine to each tube, and filling the space between the interior of the tubes and the spines with active material e.g. lead oxide powder from a hopper and shaking the assembly to compact the powder in the tube. This method has considerable problems including waste of lead oxide powder, inconsistency of filling weight, and unevennes of filling, the active material tending to become over consolidated at what is the bottom of the tubes during filling but is the top of the tubes in use.

One proposal, in G.B. Pat. No. 947,796, for reducing these problems was to extrude an active material paste containing a water soluble thickening agent into the tubes under high pressure. However, this method resulted in plates which had unpredictably variable electrical performance. There was also a tendency for the paste to break down and lose its fluidity under pressure and also to go solid inside the machinery if there were any intervals or delay in the production sequence.

Another proposal, in German Auslegeschrift No. 2,243,377 is to inject a metered volume, corresponding to the interval volume of the tubular plate, of an acidic automotive battery paste into the tubes within a very short space of time e.g. less than 1.5 seconds. The paste has a certain amount of additional water added to it. This is alleged to form a suspension but in fact this mixture is a thick paste which is not self levelling. The pastes which are disclosed contain 3 parts grey lead oxide, 1 part red lead oxide, 2.96 parts by weight of oxides to each part by weight of acid and water and 0.06 parts by weight of 1.4 specific gravity sulphuric acid for each part by weight of oxide, i.e. 12.6% of the grey lead oxide was sulphated. The specification describes the pastes as having dynamic viscosities in the range 3000 to 4000 centipoises. No indication is given of what method of measurement of viscosity or measuring apparatus is to be used.

We have measured the viscosity of the above paste described in German Auslegeschrift No. 2,243,377 on a rotating vane viscometer as described below using the measurement technique described below.

We find that this paste has a rotating vane viscometer torque value (as defined herein) of 3.5 lbs ft. The paste is not self levelling; that is when a mass is deposited as a lump on a flat surface it does not assume a flat level surface within a period of 24 hours, though small amounts of liquids separate outfrom the solids during this period.

The process has the disadvantages of requiring accurate metering of the volume of paste to be injected and the paste is so viscous that it has to be forced into the tubes under high pressure.

This need to use high pressure results in variation in density of the paste along the length of the tubes, the paste tending to become over consolidated at the inlets to the tubes which are the bottoms of the tubes in use. In addition it introduces difficulties in getting the paste to travel the full length of a tube, especially in a deep plate. This severely limits the size of plate which can be filled. This introduces further problems in production of batteries from the paste and in use of the batteries.

We have discovered that these problems can severally and collectively be reduced by using a radically different active material composition, apparatus and method in which a pourable liquid slurry of very low viscosity is poured or fed into the tubes under gravity and then, when the tubes are full, preferably consolidated by allowing the back pressure to build up. By controlling the value to which the back pressure is allowed to rise, the degree of consolidation can be varied as desired and a very even consolidation achieved.

According to one aspect of the present invention a method for preparing enveloped plates for batteries by introducing an active material composition containing water into the porous envelope of the plate, when the envelope is assembled on the current conducting element of the plate is characterised by using an active material composition with a water content such that active material is filtered out by the porous envelope, and a bed of active material is built up in the envelope, the bed building up from the end remote from that at which the composition is introduced back to the end at which the composition is introduced, liquid issuing through the walls of the envelope throughout the period that the bed is being built up. The active material is preferably a lead oxide active material and the ratio of solids to water in the composition is preferably from 2.5:1 down to 0.4:1 by weight.

The term envelope covers arrays of separate tubes as well as arrays of tubes joined together or formed from sheets of material in addition to covering any envelope effective to form a bag or pocket around the current collecting element or elements of the plate and effective to filter out active material as a bed around the current conducting element or elements.

According to a preferred form of the present invention, a method of filling enveloped plates, preferably tubular plates, for batteries, preferably lead acid batteries, which comprises introducing an active material composition into the porous envelope of an enveloped plate e.g. the tubes, when the tubes are assembled on the current conducting element of the plate, e.g. the spines, is characterised in that the active material composition is fed into the envelope as an aqueous slurry when the envelope is disposed in a substantially vertical plane, so that the solids can settle to the bottom of the envelope under gravity, the aqueous slurry containing a ratio of active material to water in the range 2.5:1 to 0.4:1 in parts by weight, the material of the envelope being selected to filter out active material whilst allowing passage of liquids, the solids thus being at least partially retained within the envelope and the liquids at least partially passing out through the walls of the envelope, and the introduction of the slurry into the envelope is continued until the envelope is filled with active material, the pressure in the supply to the envelope then being allowed to rise to a value above 5 psi but not in excess of 100 psi and the pressure thereafter being released.

For ease of description the process will be described essentially with reference to tubular plates.

The ratio of the volume of slurry which is fed into the tubes to the total internal free volume of the tubes in the plate is preferably at least 2:1 and desirably at least 3:1, 4:1, or 5:1, preferably 5:1 to 15:1 or more preferably 6:1 to 10:1.

The internal free volume of the tubes is that volume within the internal diameter of the tubes which is not occupied by the current conducting elements.

The aqueous slurry comprises a blend of water and particulate active material. The slurry may have had no acid added to it and may be substantially free of sulphate.

The weight ratio of solids to liquids in the slurry within the above defined range which is best used depends on the particular active material which is being used, and the permeability of the tubes which are being filled.

Preferably, the aqueous slurry comprises a blend of particulate active material e.g. lead oxide and water in a weight ratio in the range 0.5:1 to 1.5:1 or 2.0:1, more preferably 1:1 to 1.8:1 or about 1.5:1.

A slurry with a 0.1:1 oxide ratio had a density of 1.1 gr./cc.; 0.5:1 a density of 1.4; 1:1 a density of 1.7; 1.5:1 a density of 2.15 and 2.0:1 a density of 2.35 grams per cc. The slurry preferably has a density of less than 2.5 grams per cc.

The solid particles in the slurry were such that less than 1% by weight were above 200 microns, and less than 1% were below 0.001 microns, 95% by weight were less than 50 microns. These particle sizes were determined by sieving.

With the non-woven fabric described below we prefer to use non-acidified slurries having a solids to liquids ratio of 2.0:1 to 0.5:1 e.g. 1.5:1 to 0.7:1.

More specifically with non-acidified slurries we prefer to use slurry compositions containing grey lead oxide or red lead oxide or blends of grey lead oxide and red lead oxide containing up to 70% red lead oxide and preferably blends of grey lead oxide and red lead oxide in a range of ratios by weight of 66:34 to 33:67.

With the spun-woven fabric described below we prefer to use non-acidified slurries having a solids to liquids ratio of 2.5:1 to 1:1.

With the woven fabric described below we prefer to use non-acidified slurries having a solids to liquids ratio in excess of 2.0:1 e.g. in the range 2.4:1 to 2.5:1.

The slurries useful in accordance with the present invention, have viscosities substantially the same as that of water, that is as compared with conventional battery pastes and the pastes proposed by Bohle in German Auslegeschrift No. 2,243,377. The viscosities of the slurries in accordance with the present invention cannot be measured by a Brookfield viscometer because the solids separate out on standing.

Slurries useful in accordance with the present invention are readily pourable and the solids settle out rapidly from the liquid phase, namely in less than 15 minutes on standing.

Thus the compositions are characterised by having a rotating vane viscometer torque value (as defined herein) of less than 0.006 preferably not more than 0.004 lbs. ft. at 20° C.

The suspension half life (as defined herein) of the slurries is preferably not more than 15 minutes preferably in the range 1 to 10 minutes.

The slurries have viscosities substantially independent of shear rate that is to say they are not thixotropic gels and whilst the viscosities fall with increase in shear rate this fall is not pronounced and a gel does not form when the shear force is removed.

The slurry can contain conventional fillers and additives for the active material such as hydrophobic or hydrophilic silica, e.g. 0.1 to 0.5% by weight based on the oxide. The introduction of the slurry into the tubes is preferably carried out under gravity i.e. at zero pressure or at a pressure of less than 5 psi until the tubes are filled with the composition, the pressure then being allowed to rise to a value not in excess of 100 psi and the pressure thereafter being released.

In one arrangement, the tubes are allowed to fill substantially under gravity and then the pressure is allowed to build up to apply pressure to the active material in the filled tube for only a fraction of the time taken to fill the tube. Thus the pressure may be in the range 5 to 50, e.g., 10 to 30 psi, applied, e.g. for one-tenth to one half the time taken to fill the tube or for a time equal to that taken to fill the tube. Thus the tube may take 5 to 15 seconds to fill and the pressure may be applied for 1 to 5 seconds.

In another arrangement the pressure is applied for longer periods of time. In this arrangement, the tubes are allowed to fill substantially under gravity by the slurry being pumped into the tubes under zero back pressure, once the tubes have filled the pumping is continued and the back pressure allowed to build up to a value not in excess of 70 psi. Thus the pressure may be in the range 5 to 50, e.g. 10 to 30 psi. The weight of oxide in the tubes can be adjusted by adjusting the pressure build up as it is indicated in the examples. Usually the pressure is merely allowed to build up to a set value at which point the pressure is released.

Surprisingly and in contrast to the prior proposals where the whole filling operation is carried out under high pressure, which results in the active material being stratified, the paste being more dense nearer the inlet, this arrangement enables the density of the active material in the tube to be increased evenly throughout the tube without stratification occurring.

The material of the tube as indicated above is selected to have a filtering action on the active material used. However this does not mean that all the active material is removed from the liquids issuing from the tubes merely that a proportion is retained within the tubes.

As mentioned above the ratio of active material to liquids which should be used depends on a variety of factors including the nature of the material from which the tubes are made.

A balance must be struck between the need for the material to have a high water permeability to provide good conductivity in use in the battery and the need for the material to have a good filtering action so as to enable filling to be carried out rapidly and the active material to be retained in the tubes over long periods of use and conditions of shock and vibration. One suitable material is made from a non-woven batt of polyester fibres which is 0.5 to 0.7 mm. thick and weighs 120 to 160 grams per sq. cm. This is not perforated its porosity being derived from the various gaps between the fibres from which it is made. It has a nitrogen permeability (as hereinafter defined) of 8.0 liters/sq.cm./ minute, and water permeability (as hereinafter defined) of 1.5 liters/sq.cm./minute.

More broadly, it is preferred to use a material having a nitrogen permeability in the range 0.5 to 20 preferably 1 to 10 or more preferably 3 to 9 liters/ sq.cm/min. Desirably, it should also have a water permeability of at least 0.01 liters/sq.cm./min. preferably 0.1 or 0.5 to 1, 2 or 5 liters per minute or more.

As indicated below, it is preferred to use a slurry composition in which the active material particles have an average particle size in the range 5 to 20 microns.

However, material with average particle sizes in the range 1 to 30 or 50 or 100 microns can equally well be used so long as the tube material still has adequate filtration action. Active material of higher particle size such as granulated material, e.g., of particle size 0.1 to 1.0 mm., can be used and if desired blends of active material of differing particle size can be used.

The active material may be any desired for the particular battery being made and whilst the invention is described with reference to lead acid batteries the teaching of the invention concerning the necessary requirements for the active material composition and the material of the envelope, whereby filtration filling is achieved and a bed of active material is built up from the bottom bottom of the envelope (the top in use) can be applied to other electrochemical systems.

Referring again to lead acid systems the lead oxide preferably has substantially all of its particles having particle sizes less than 100 microns, e.g., less than 1% by weight are above 200 microns in diameter. In addition, less than 1% is below 0.0001 micron in diameter. Typically, at least 50%, e.g., 95% by weight, is less than 50 microns, 50% by weight is less than 10 microns and 5% is less than 1 micron. The oxide may comprise a blend of grey lead oxide of average particle size 20 microns and red lead oxide of average particle size 5 to 10 microns. The ratio of grey to red lead may be in the range 95:5 to 5:95 though 90:10 to 50:50, e.g. 33:67 is preferred.

Preferably, the tubes are clamped at the top and bottom so that the liquids can escape out from the whole area of the tubes.

Desirably, a supply of the slurry composition is continuously mixed during the filling and a minor proportion of the slurry supply is introduced from this continuously mixed supply into each tubular plate.

The supply of slurry composition is preferably delivered by a pump which gives smooth delivery and maintains the slurry in suspension and the slurry, in the intervals between introduction into a tubular plate, is recirculated from the outlet of the pump back to its inlet, e.g., via a recirculating tube, connected to the pump outlet, and an agitated storage tank, from which a supply tube extends to the pump inlet.

In a first form of the method, the slurry is introduced from a pump into one tubular plate then when that plate is filled is continuously recirculated from the outlet of the pump to the pump inlet and is then introduced into another tubular plate.

The apparatus for carrying out the method in accordance with the invention preferably comprises at least one filling station comprising means for supporting the envelope of a plate assembled on its current conducting element in a substantially vertical plane and a filling manifold adapted to introduce slurry into the envelope of a plate located in the said supporting means, the apparatus further comprising, a slurry storage tank provided with agitating means adapted to contain a supply of active material slurry, and delivery means for delivering the slurry from the storage tank to the manifold of a selected filling station.

The delivery means preferably include recirculating means for recirculating the slurry to the storage tank when the slurry is not being delivered to a filling station.

The delivery means may comprise a pump having an inlet pipe communicating with the storage tank and valve means, the recirculating valve, communicating with the outlet of the pump for directing, preferably selectively station, or when more than one station is used, to a selected station, or for recirculating the slurry to the storage tank.

The means for supporting the plates are preferably adapted to support tubular plates and comprise a frame rigidly secured to the filling manifold and carrying top and bottom clamps arranged to releasably clamp the plate to the frame.

The clamps may be toothed and conform to the outside surface profile of the bottom and top of the tubular plate.

At least the top clamp is preferably provided with a resilient sealing liner.

The manifold of preferably adapted for use with tubular plates and then preferably has an outlet nozzle assembly consisting of rigid feed tubes spaced apart in a straight line with their centres on the centres of the tubes of the plate and having external diameters corresponding to the internal diameters of the tubes of the plate. Thus the tubes are preferably arranged vertically so that the slurry is The feed tubes may extend through a resilient gasket, the dimensions of the frame in relation to the plate being such that the end of the plate has to be forced up into the gasket in order to locate the plate in the supporting means.

Preferably a pressure responsive valve is located in communication with the inlet side of each filling manifold.

Preferably at least two filling stations are provided for each pump and slurry storage tank and the recirculating valve is a three way valve.

The or each pressure responsive valve may be arranged to actuate automatic switching of the recirculating valve or the valve means connecting the or each manifold to the common feed pipe to the recirculating position and to release the pressure on the plate as soon as a preset pressure is reached.

The pump preferably comprises a rotor in the form of a single start helix fitting in a cylinder in the form of a double start helix of twice the pitch of the rotor, in which the rotor turns about its own axis in one direction, whilst its axis orbits about the axis of the cylinder in the opposite direction at the same speed.

In a further broader aspect of the invention the method is not restricted to the filling of tubular sheathed plates. Thus other shapes of sheath can be used, e.g. envelope shaped sheaths and in this case the grid need no longer be in the form of a comb of spines but could be a conventional cast grid or a reticulated plate, e.g. an expanded metal mesh or a sheet with apertures punched through it, it could even be a solid plate so long as the necessary current collecting function was adequately carried out.

The sheath can be of flexible material or of rigid or stiff material but at least when the sheath is flexible it is preferred to support its faces with porous support means, e.g. rigid foraminous sheets, meshes or grids during the filling operation so as to keep the plate substantially parallel sided whilst permitting the liquids to pass through.

With this arrangement the inlet manifold also has to be modified so that, instead of a row of tubes which plug into the ends of the individual tubes of the sheath, a single or double tubular slot is provided to plug into the open bottom end of the sheath. A double slot arrangement which nests over the end of the grid and affords a pair of slots extending along either side of the grid and can be clamped thereto may have advantages over a single slot arrangement.

The end of the sheath can be sealed with an elongated bottom bar after filling. This can consist of an internal plug gripping the end of the grid and an external clip or integral flange on the plug arranged to grip the outside of the envelope and hold it in against the plug.

In another alternative instead of an inlet manifold of fixed tubular outlets or fixed slots an arrangement of retractable filling tubes extending down into the sheath can be used. The arrangement would start with the filling tubes fully extended down into the sheath around the spines (which now need not have centering fins since the filling tubes perform this function). As the active material issues from the ends of the tubes the tubes are withdrawn up along the sheath and finally halt at the open top end of the sheath where they may be momentarily clamped and then released to complete filling of the plate.

Clearly however this arrangement is more complicated than the arrangement in which the slurry is merely fed in at the tops of the tubes and this simple arrangement is much preferred.

The invention may be put into practice in various ways and two specific embodiments and certain modifications will be described by way of example with reference to the accompanying drawings, in which.

Figure 6:
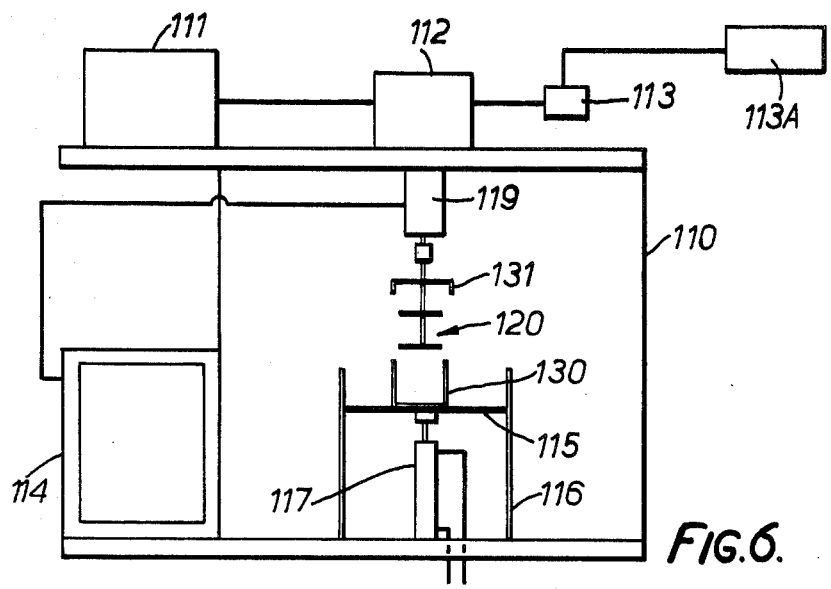
FIG. 6 is a general front elevational view of the rotating vane viscometer used to measure the viscosities of the slurries used in the invention.
Figure 8:
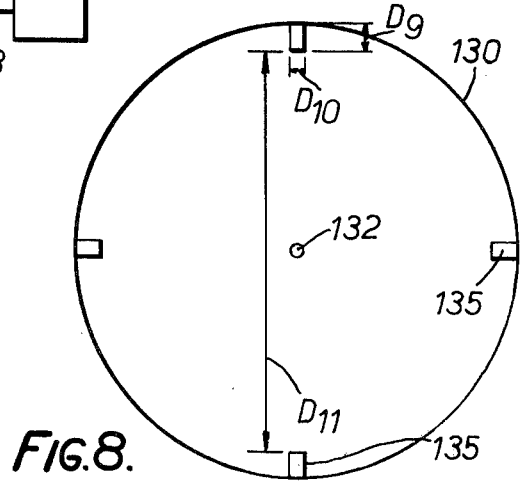
Figure 9:
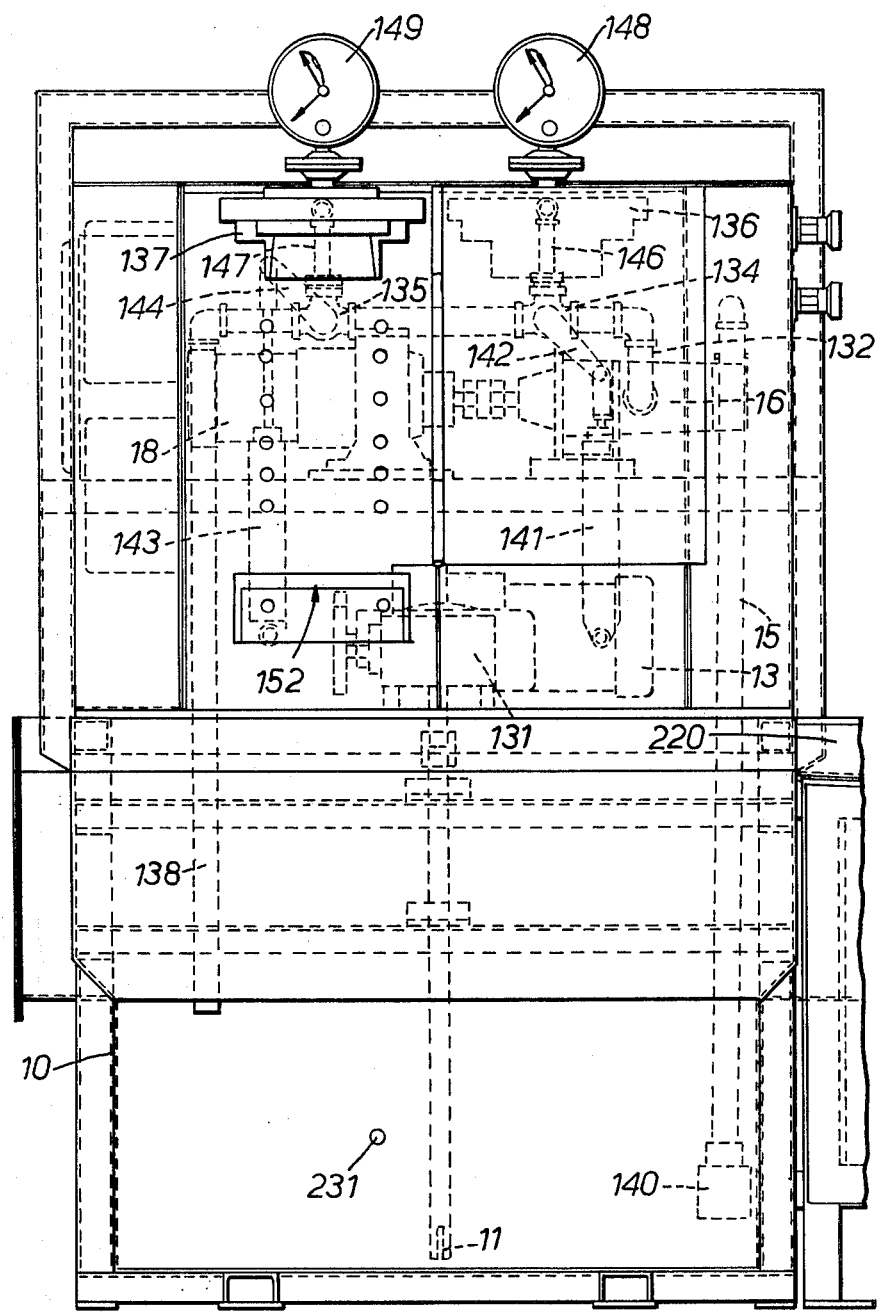
Figure 10:
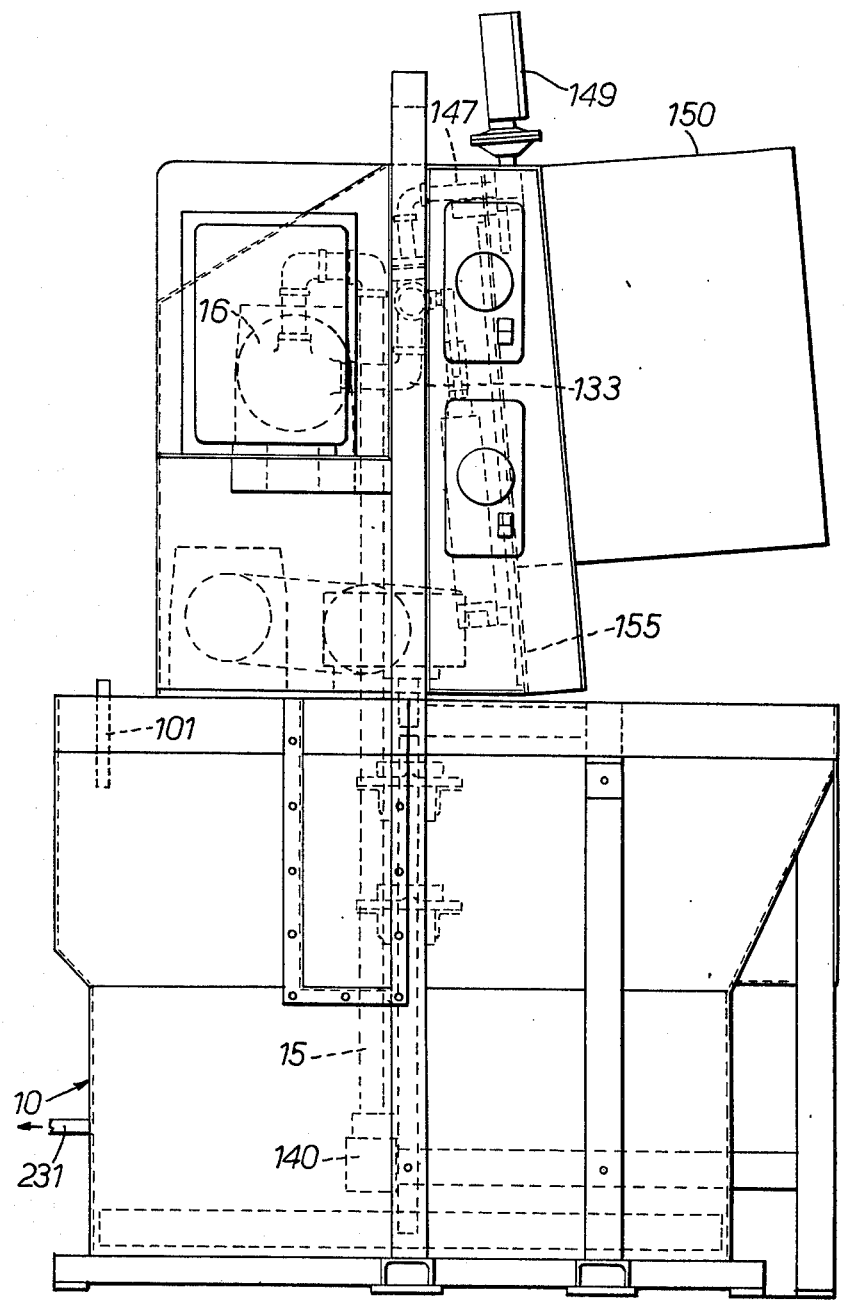
Figure 11:
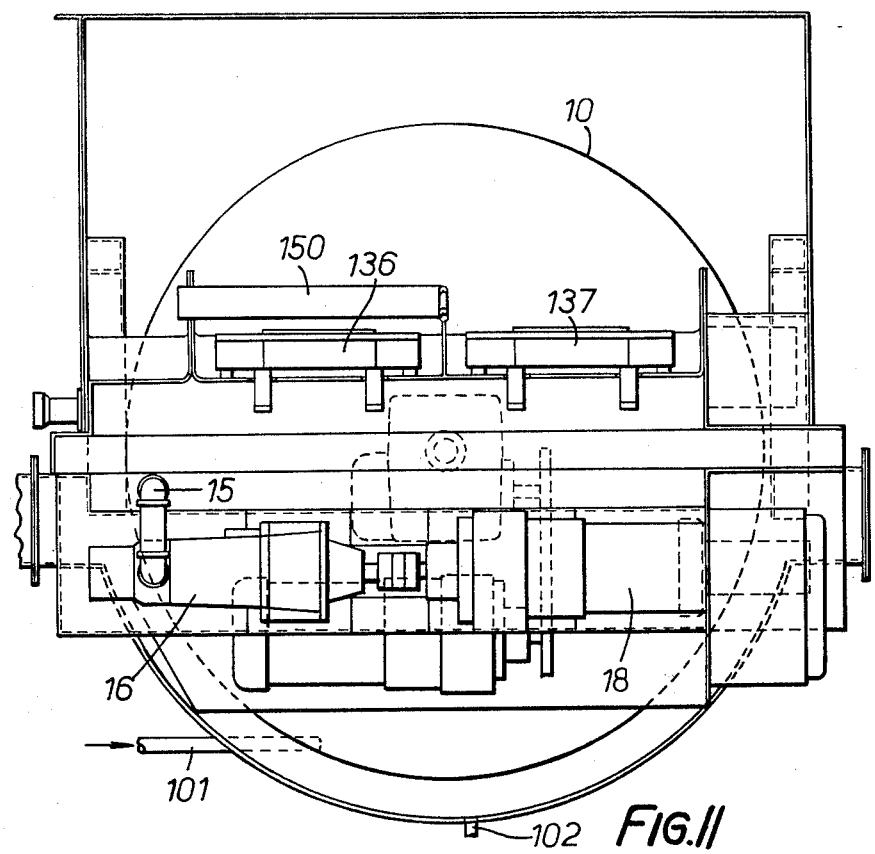
Figure 12:
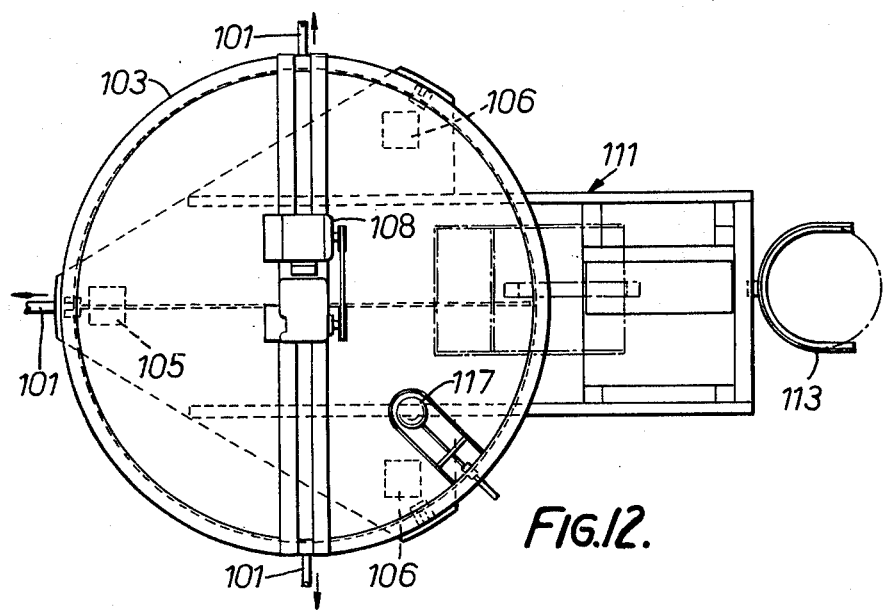
Figure 13:
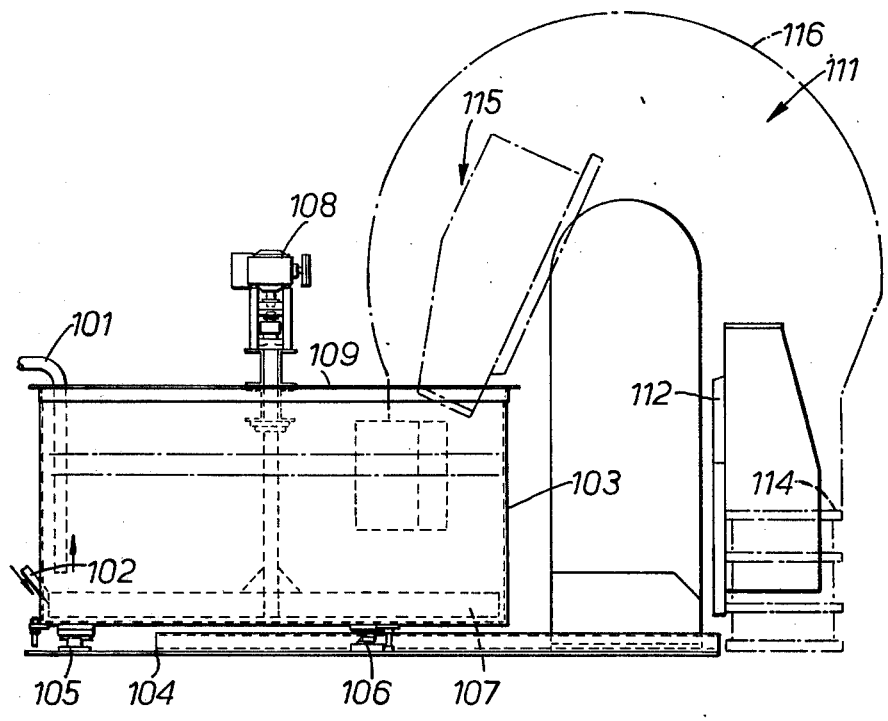
Figure 14:
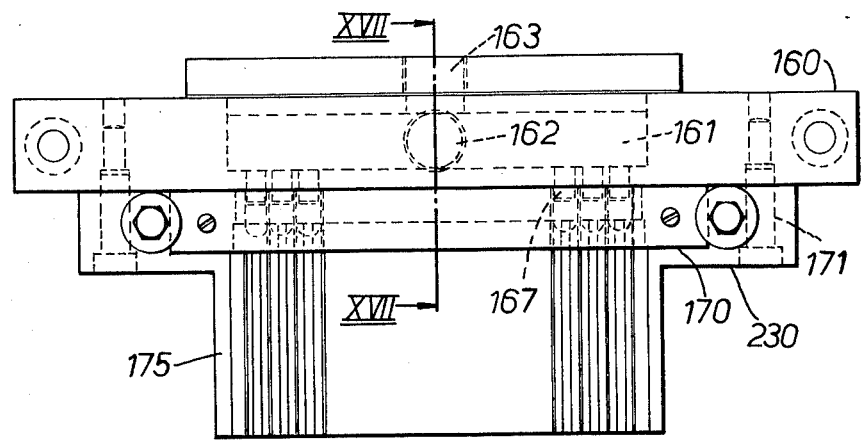
Figure 15:
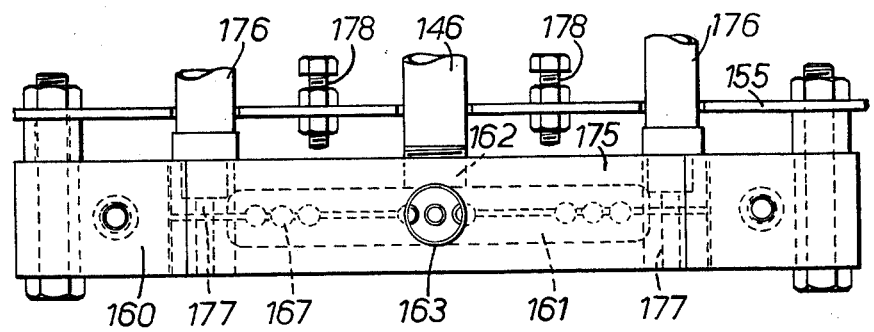
Figure 16:
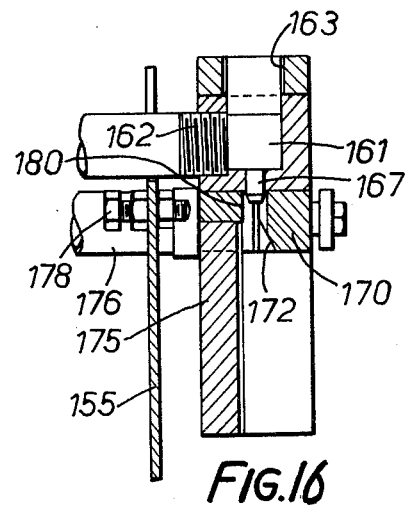
Figure 17:
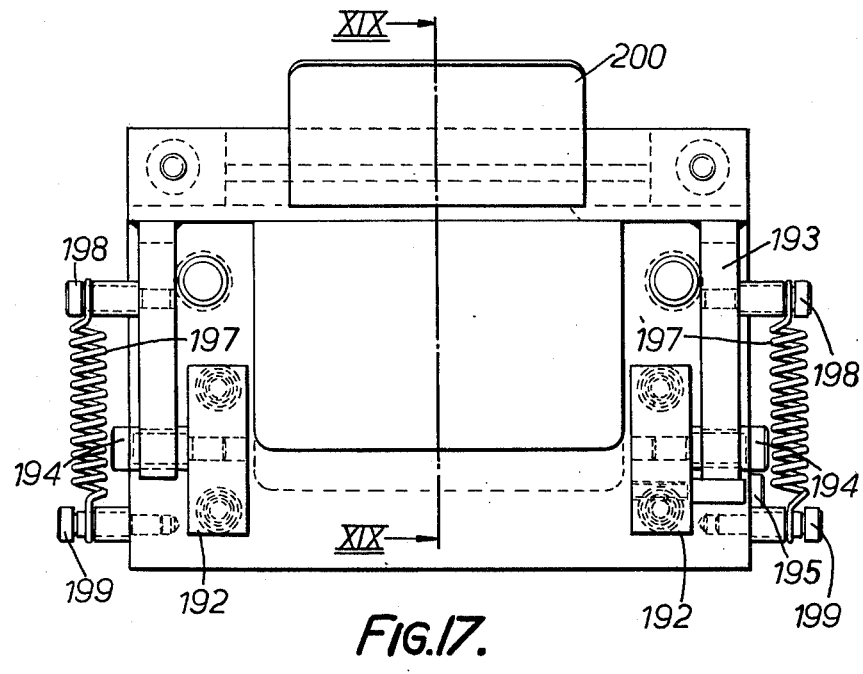

FIG. 8 is a plan view of the container for use with the viscometer of FIG. 6 for containing the sample whose viscosity is to be measured; and FIG. 9 is a front elevation of a preferred form of satellite filling station for use in a modification of the invention in which a central slurry preparation station supplies slurry to a number of satellite filling stations, FIG. 10 is a side elevation of the satellite filling station shown in FIG. 9, FIG. 11 is a plan view of the satellite filling station shown in FIG. 9, FIG. 12 is a plan view of the central slurry preparation station referred to above in connection with FIG. 9, FIG. 13 is a side elevation of the station shown in FIG. 12, FIG. 14 is a front elevation of a preferred form of filling manifold and upper clamp as used in the filling station shown in FIG. 9, FIG. 15 is a plan view of the filling manifold shown in FIG. 14, FIG. 16 is a cross sectional view on the line XVII—XVII of FIG. 14, FIG. 17 is a front elevation of a preferred form of bottom clamp as used in the filling station shown in FIG. 9, and FIG. 20 is a vertical cross section on the line XIX—XIX of FIG. 17.

The apparatus consists of a slurry tank 10 in which the slurry to be filled into the plate tubes is stored. The tank is fitted with a paddle 11 located at the bottom of the tank and driven by a belt and pulley drive 12 from a variable speed motor 13. A vertical feed tube 15 extends up from just above the paddle 1 to the inlet to a supply pump 16 which is also driven by a belt and pulley drive 17 from a variable speed motor 18. The outlet of the pump 16 is connected vertically downwards by a supply pipe 19 to a plate filling station 20. The supply pipe proceeds via a pressure gauge 22 a two-way valve 23 and a fishtail manifold 24. The valve 23 either permits the slurry the flow vertically downwards to the station 20 or can be positioned to direct the slurry to the tank 10 via a recirculating tube 26 which extends down to just above the paddle 11. The tubes 15 and 26 are preferably of the same cross-sectional area.

The mass of the supply of slurry is preferably maintained at about 150 kg., or more broadly 100 to 200 kg., and the mass of slurry introduced into each tubular plate, the individual filling weight, is of the order of 400 to 1,000 gm. More broadly, the weight ratio of the active material, e.g., 75 kg, in the continuously mixed slurry supply to the individual filling weight is in the range 200 : 1 to 25 : 1, e.g., 160 : 1 to 100 : 1.

The station 20 comprises a frame 29 rigidly secured in relation to the manifold 24 and carrying top and bottom clamps 30 and 31.

The clamps 30 and 31 are toothed and conform to the outside surface profile of the bottom and top of the tubular plate since the plate is inserted in the clamps with its open bottom end facing the manifold 24. The manifold has an outlet nozzle assembly consisting of ¼ inch long copper or other rigid feed tubes with external diameters corresponding to the internal diameters of the plate tubes and spaced apart in a straight line, the centres of the feed tubes being on the centres of the plate tubes.

Thus the open ends of the plate tubes fit snugly over the feed tubes and are clamped thereto by the top clamp 30 which may be provided with a resilient sealing liner.

The lower clamp 31 holds the plate in position and presses the tubes against a thickened end section on the spines. The faces of the plate are completely free.

The spines are of conventional lead alloy composition and of conventional structure being located on a top bar at centres corresponding to the centres of the tubes with which they will be used. They are desirably provided with short axial fins which are used to centre the spines in the tubes and to prevent the spines being distorted during handling prior to filling.

The station 20 will now be described in more detail with reference to FIGS. 2 to 5.

As mentioned above, the station 20 comprises a frame 29 rigidly secured in relation to the manifold 24. This frame is in two parts 32 and 33 hinges to each other along the left hand edge, and it is the part 33 which is rigidly attached to the manifold 24. The top and bottom clamps are each in two parts 30A and 30B and 31A and 31B. 30A and 31A are carried by the movable part 32 of the frame 29 and 30B and 31B are carried by the fixed part 33 of the frame 29.

The fixed part 33 also carries top and bottom locking levers 36 and 37 which are arranged to engage top and bottom handles 38 and 39 on the movable frame part 32, and lock the filling station closed.

The fixed part 33 of the frame 29 also carries a bottom support bar 42 which has an aperture 43 through which the lug 44 of a plate 45 can pass and which assists in registering the plate in the filling station.

The top and bottom clamps 30 and 31 have toothed profiles which conform to the external sheathed dimensions of the plate and the two portions of each clamp when closed define a row of cylindrical holes 48 connected by gaps 49 twice the thickness of the fabric 47 of the sheath so as to prevent the sheath being cut by the clamps.

The bottom clamp 31 presses the fabric 47 of the sheath against the broadened shoulders 51 of the spines 52 of the plate to ensure a tight seal. (See FIGS. 3 and 4).

Figure 1:
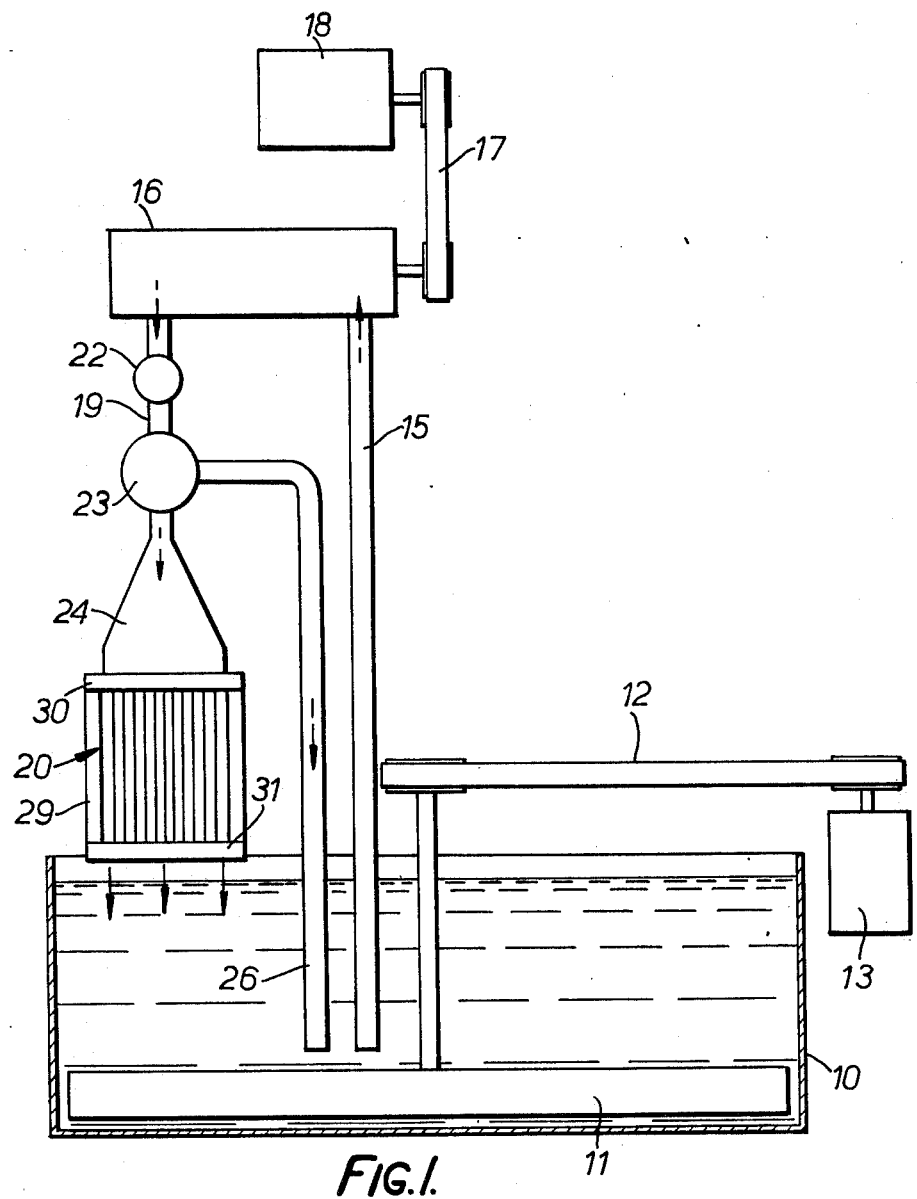
FIG. 1 is a diagrammatic side elevation of one embodiment of apparatus in accordance with the invention.
Figure 2:
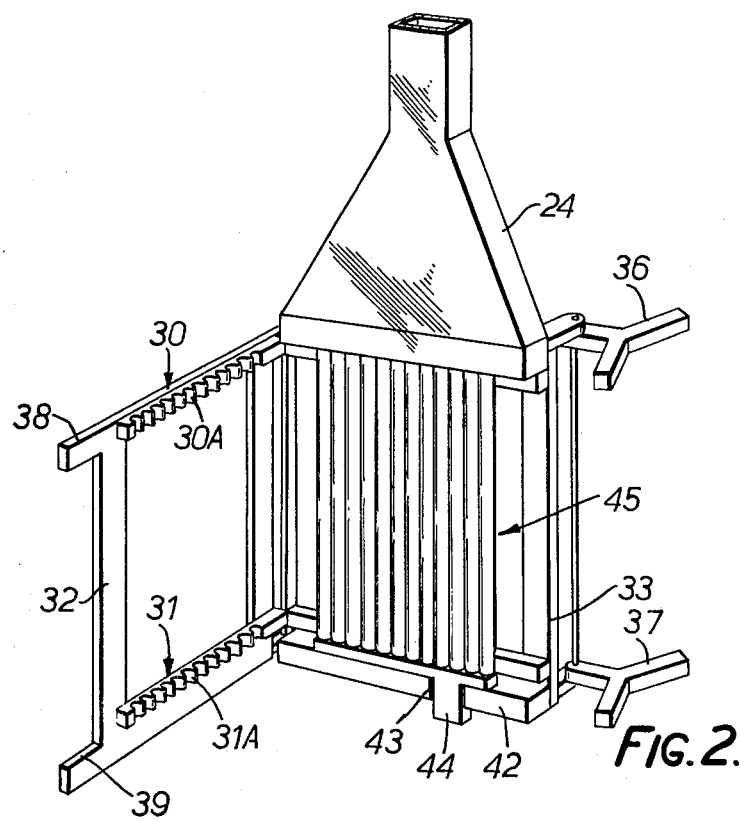
FIG. 2 is an enlarged diagrammatic perspective view of the filling box shown in FIG. 1.
Figure 4:
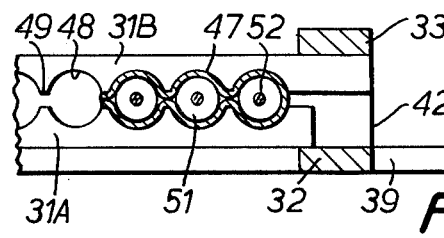
FIG. 4 is a cross-sectional plan view on the line IV—IV of FIG. 3.
Figure 3:
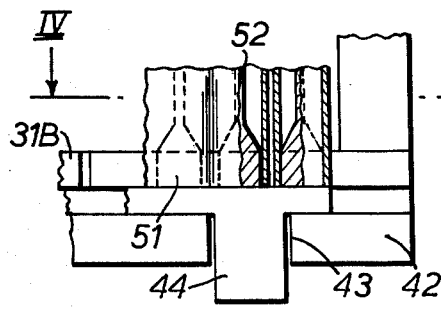
FIG. 3 is a diagrammatic view of part of the lower clamp shown in FIG. 2 in the open position, showing only some of the tubes of the plate.
Figure 5:
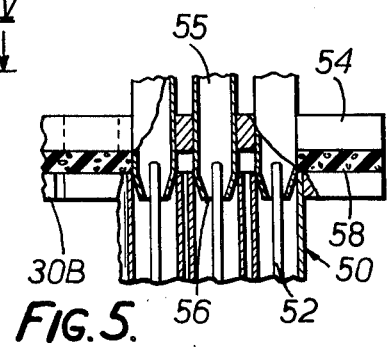
FIG. 5 is a part cross-sectional view of part of the upper clamp in the open position, as in FIG. 3.

FIG. 5 shows the clamping arrangement at the manifold 24. A manifold plate 54 has a row of feed tubes 55 passing down through it and having narrowed ends 56 which extend through apertures in a rubber gasket 58. It is resilient being compressible by finger pressure to only about half its uncompressed thickness, which is about ⅛ inch thick. FIG. 5 shows the sheath 47 in position over the ends 56 of the feed tubes. However, the arrangement is in fact such that the gasket 58 has to be compressed by about 1/16th inch by the sheath 47 being forced up into it in order to get the top bar of the plate onto the bottom bar 42 of the frame. (This compression has not been shown on the drawing). The clamp 30 presses the fabric 47 of the sheath around the ends of the feed tubes 56 of the feed tubes 55 to achieve a good top seal. Thus the tubes are filled whilst vertical with their top bar at the bottom.

The pump 16 is one which gives smooth delivery and is of the well known type, such as that marketed under the trade name MONOPUMP, which comprises a rotor in the form of a single start helix fitting in a cylinder in the form of a double start helix of twice the pitch of the rotor, in which the rotor turns about its own axis in one direction whilst its axis orbits about the axis of the cylinder in the opposite direction at the same speed. This form of pump gives a positive displacement with uniform flow, and prevents the separation of liquids and solids in the slurry.

In another arrangement (not shown) the filling station 20 is formed as a twin manifold arrangement each manifold being fed from the pump 16. The two way valve 23 is replaced by a three way valve and each line from the valve 23 to a manifold contains a pressure responsive valve 70.

This valve 70 is preferably a pressure release valve which can be set to any desired pressure e.g. 15 psi and when this pressure is reached will hold the pressure at 15 psi until actuated, e.g. manually.

The procedure would then be for a plate to be inserted in one manifold and the valve 23 switched either from recirculation or from the other manifold. The plate would fill e.g. in 5 seconds and then the pressure would rise to 15 psi and be held there for 5 seconds. During this time the operator would have removed the filled plate from the other manifold and inserted a new plate. He could then switch the valve 23 either to recirculate momentarily or immediately to fill the new plate.

In an alternative arrangement the pressure release valves 70 is arranged to switch the pump supply to recirculation and release the pressure on the plate as soon as the preset pressure is reached.

In operation, the filling process is as follows.

The slurry is made up to the desired composition in the tank 10 by use of the paddle 11. A tubular plate 50 is assembled, the non-woven fabric tubes 47 being located on the metal spines 52, and it is positioned against the clamps 30B and 31B at the station 20 with its open bottom ends pushed up against the gasket 58 and over ends 56 of the feed tubes 55 of the manifold 24. The part 32 of the frame is then swung closed against the part 33 and the clamps 30 and 31 thus closed and the locking arms 36 and 37 secured over the handles 38 and 39. The paddle 11 is kept in operation and the valve 23 is turned to the recirculating position connecting the pump 16 to the tube 28 and the pump 16 is switched on. Recirculation is carried out until the flow is steady. The pressure indicator 22 indicates zero pressure whilst recirculating is occurring.

The valve 23 is then switched to connect the pump 16 to the manifold 24. The slurry passes down through the station 20, some of the active material settling into the interior of the tubes whilst excess liquid and active material drains through the fabric 47 of the tubes and back into the tank 10. The valve 23 is maintained in this position until the tubes have filled with active material at which point the pressure indicator indicates a relatively sudden increase in pressure. The valve 23 is then switched to recirculate the slurry to the tank 10 via the pipe 26.

The clamps 30 and 31 are then opened and the filled plate removed and the further processing operations such as bottom bar insertion, pickling, drying and electrolytic formation carried out on the plate.

The excess slurry in the manifold 24 falls down into the tank 10.

In continuous operation, the pressure rise indicated by the indicator 22 could be used to control the filling cycle, e.g., to activate the valve 23, and open the clamps 30 and 31 to disengage it from the manifold 24 and re-engage a new plate in the clamped position. Limit switches could be provided, which would be activated by the new plate engaging the manifold 24 to divert the valve 23 back to the filling position.

In the modification shown in FIGS. 9 to 18 two or more, e.g. three, satellite filling arrangements as shown in FIGS. 1 to 5 are supplied with slurry from a central slurry reservoir and make-up tank which is mounted on a balance so that it can be continuously weighed. The reservoir is continuously stirred and is provided with a float controlled water supply so as to maintain the volume of slurry constant. The slurry starts off at an oxide to water ratio of 1.5:1. Each satellite filling arrangement is supplied with slurry by a variable speed pump. Once the weight of the reservoir has dropped by 1200 lbs and the oxide water ratio has fallen to 1.2:1 the pumps to the satellites are switched off. 800 lbs of red oxide and 400 lbs of grey oxide are added. The oxide water ratio in the satellites falls to about 1:1 whilst this is being done. When the feed from the reservoir to the satellites is recommenced the solid/liquid ratio is reestablished.

In this arrangement it is preferred to increase the volume of the tank 10 in the satellite filling arrangement so that when the supply from the main tank is switched off during replenishment the oxide to water ratio does not fall too much. Thus the mass of slurry is preferably in the range 500–625 kg and thus the weight ratio of the active material in the slurry to the individual filling weight (e.g. 200–1200 grams) is in the range 1300:1 to 200:1 e.g. 1000:1 to 250:1. The mixing of the slurry continues in the reservoir during the oxide addition and once this is completed the pumps to the satellites are switched on again.

The central slurry preparation station 100 is shown in FIGS. 12 and 13. The preferred form of satellite filling apparatus 130 is shown in FIGS. 9 to 11 and 14 to 18.

Three such identical filling apparatus 130 are preferably fed by the central station 100 by a pumped supply pipe 101 and a pumped or gravity return pipe 102.

The central station comprises a circular slurry tank 103 mounted on a base plate 104 via a load cell 105 and a pair of cross spring flexures 106. The load cell and flexures are placed on the corners of an equilateral triangle. A vertical paddle 107 is mounted for rotation about a vertical axis in a horizontal plane at the bottom of the tank 103 and is driven by a motor 108 so as to maintain the solids in suspension in the tank 103. The tank has a lid 109 with a shrouded aperture 110 (not shown) through which a powder supply mechanism 111 can tip powder into the tank 103.

The powder supply mechanism 111 consists of a hoist 112 having a cradle 113 arranged to engage a drum 114 of active material and lift it up and around a circular path and tip it into the tank at the position 115 shown in chain lines in FIG. 13. The mechanism 111 is enclosed in a shroud 116 as indicated in chain lines in FIG. 13. The tank 103 is kept topped up with water by means of a ballcock 117.

We refer now to the preferred form of filling apparatus as shown in FIGS. 9 to 11. This is closely similar in general arrangement to the apparatus shown in FIGS. 1 to 5 and the same reference numerals will be used for the same parts.

Thus the slurry tank is fitted with a paddle 11 located at the bottom of the tank and driven by a variable speed motor 13 via a gear box 131. A vertical feed pipe 15 with a filter 140 at its lower end extends up from just above the paddle 11 to the inlet to a MONOPUMP supply pump 16 driven by a variable speed motor 18.

The outlet 132 of the pump 16 is connected to a common supply pipe 133 which extends past a pair of inlet valves, 134 and 135 to a pair of filling manifolds 136 and 137, on to a recirculation pipe 138 which extends down to the slurry tank 10.

The valve 134 is under the control of a pneumatic cylinder 141 and crank 142 and is arranged to always be either open to the manifold or on bypass. The valve 135 is similarly arranged. The valve 135 is under the control of a similar cylinder 143 and crank 144.

The valves 134 and 135 supply the manifolds 136 and 137 via pipes 146 and 147 which extend up from the valves to the manifolds so that any settlement in these pipes will tend to be in the region of the valves 134 and 135 and can be readily flushed out. Pressure gauges 148 and 149 are placed in the pipes 146 and 147 and are arranged with pressure cut off devices so that as soon as the pressure in the pipe 146 or 147 reaches a predetermined value, which can be preset as desired, the cylinder 141 or 143 is automatically actuated and the supply from the pump is switched to bypass and is returned via pipes 133 and 138 to the tank 10.

The cylinders 141 and 143 are also arranged to be under the control of switches actuated by a door 150 (though this can be bypassed if desired). The door on being closed over one manifold e.g. 151 in FIG. 11 switches the valve 134 from bypass to feed and the slurry is supplied to the manifold 136. When the pressure rises and cuts off, the door can then be swung to the other side to actuate the valve 143 for the other filling manifold 137.

The filling manifolds 136 and 137 are associated with bottom clamps 152 only one of which is shown in FIG. 10 for clarity in the drawings. The manifolds and bottom clamp are mounted on a backing plate 155 (see FIG. 10) which is inclined backwards at a slight angle to the vertical so as to facilitate insertion of plates into the clamps and to prevent the plates falling out before the clamps are closed.

Figure 18:
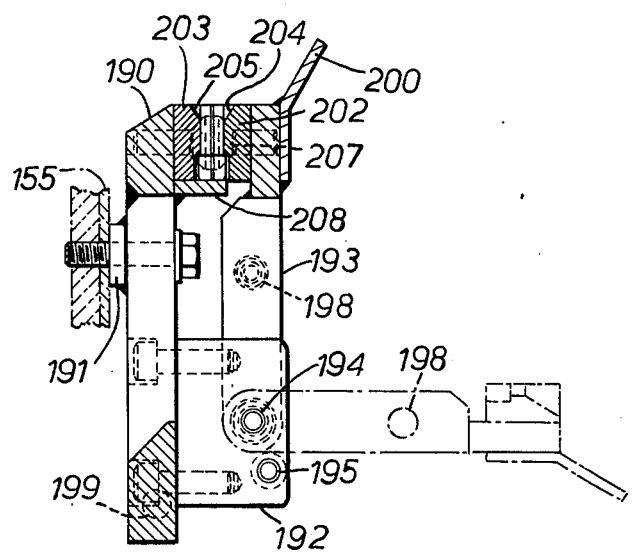

The filling manifolds are shown in greater detail in FIGS. 17 and 18.

Referring first to FIGS. 14 to 16 the manifolds consist of a manifold body 160 bolted to the mounting plate 155 and affording a rectangular horizontal slurry distribution cavity 161 which is fed from the rear by a central port 162 to which the pipe 146 or 147 is connected. At the middle of the top face of the cavity 161 there is a port 163 in which the pressure gauge 148 or 149 is located.

A row of nozzles 167 extends down from the bottom face of the cavity 161 out of the body 160 and it is over these short nozzles that the fabric tube is fitted and to which it is clamped. The clamping is achieved by a moveable front clamp face 170 carried in a frame 230 which is secured by vertical bolts 171 to the body 160. The inside face of the clamp 170 is a series of rounded teeth as in FIG. 5 but the teeth are chamfered as shown in FIG. 16 by the reference numeral 172.

The front clamp 170 co-operates with a movable rear clamp 175 and the two clamps are actuated by a pair of pneumatic cylinders 176 mounted on pistons 177 which are secured to the front clamp 170.

The cylinders 176 are secured to the rear clamp 175 and thus when they are actuated to force out the pistons 177, they drive the clamp face 175 rearwards towards the mounting plate 155 and simultaneously drive the front clamp 170 forwards. The amount of such travel can be varied by means of the adjustable stops 178. The clamp 175 has a round toothed top edge 180 which clamps the rear edge of the fabric to the nozzles 167 and this edge 180 is also slightly chamfered as shown in FIG. 16. The clamp 175 also has a grooved skirt 181 to assist location of the plate in the clamp. Thus, the plate can be rested on the skirt 181 in the correct grooves and then slid into the clamp.

Referring now to FIGS. 17 and 18 the bottom clamp 152 consists of a back frame 190 bolted to the mounting plate 155 but separated therefrom by a spacer 191 so that liquids issuing from a plate in the clamp can flow down behind it. A pair of side flanges 192 are bolted to the back frame 190 and a front frame 193 is hingedly attached by pivots 194 to these flanges. At least one of the flanges also carries a stop 195 to prevent the front frame 193 moving through more than 90° from the close position. The front frame is held in the closed position or in the open position by an overcentre spring arrangement, a spring 197 extending on each side of the clamp from a pin 198 on the front frame to a pin 199 on the rear frame.

A finger grip 200 is attached to the outside top edge of the front frame. The opposed inside top edges of the back frame 190 and the front frame 193 carry co-operating round toothed clamps 202 and 203 both of which have their top inside edges chamfered so indicated at 204 and 205. The clamps are so dimensioned as to press the fabric of the tubing tight against the broadened shoulders 207 of the current collecting spines.

A horizontal bar or projection 208 extends out below the clamp 203 and is arranged to support the top bar of a plate and has a gap down through which the lug of the plate can extend.

Each satellite filling apparatus is provided with a work bench 220 and sink adjacent to the tank 10. Part of the work bench 220 is shown on the right hand side of the tank 10 in FIG. 9 of the drawings. This provides an area where the plant operator can insert a bottom bar in the open end of each plate, e.g. a conventional plastic e.g. polyethylene plug which is hammered onto the ends of the spines. A balance may also be provided to enable the operator to check the weight of each filled plate.

A monopump 230 (not shown) is located under the work bench in the supply line 101 from the tank 103 to the tank 10 and is arranged to pump about 10 gallons of slurry per minute into the tank 10, which has a capacity of about 30 gallons. The return pipe 102 is a gravity return and the filling apparatus 130 is thus preferably raised on staging about 1 foot above the floor level. A pumped return could however be used if desired.

If desired a larger tank, e.g. of 50 gallons, can be used. Thus the slurry in the tank 10 is desirably replaced about every 5 to 15, e.g. 10, minutes.

The apparatus is used as follows.

The slurry is made up to the desired composition in the tank 103 and then pumped continuously via pipe 101 by the pump 230 into the satellite tanks 10 and recirculated therefrom by an overflow pipe arrnagemnt 231 connected to the return pipe 102.

The weight of slurry in the tank 103 is continuously or periodically measured by the load cell 105 and when it has dropped to a preset value a warning is given to the operator.

The slurry in the tanks 10 is continuously mixed and pumped by the pump 16 through the circuit; pipe 15, pump 16, pipe 132, valve 134 on by-pass, valve 135 on by-pass, pipe 138.

A plate comprising fabric tubes assembled on the current conducting spines having dimensions appropriate to the top and bottom clamps being used is located in one filling manifold e.g. 136 and the top and bottom clamps closed. The door 150 is now shut and if the automatic arrangement is in operation, the cylinder 141 switches the valve 134 to connect the pump 16 to the manifold 136. The plate fills, the pressure in the manifold cavity 161 builds up and at the preset value triggers the pressure gauge 148 which in turn actuates the cylinder 141 which moves the valve 134 back to by-pass.

As soon as the door 150 was shut, the operator could fit another plate into the manifold 137. Thus, as soon as the first plate has filled, he can start filling the next plate either before or after removing the first plate. The cycle can then be continued until the main tank 103 needs replenishing and this can if necessary be carried out by another plant operative.

At the end of a shift or whenever the filling station is to be left, it is prudent for the slurry to be pumped from the tank 10 back into the tank 103 and the filling station to be thoroughly cleaned and its pipe work flushed out with water.

The invention in its prefereed form has referred to the plates being filled while in a substantially vertical plane and whilst in FIGS. 1 to 5 the plates are filled whilst vertically disposed, in FIGS. 9 to 18, and as shown in FIG. 11, the plates may be filled equally well when disposed at an angle of about 5° to the vertical.

It will be appreciated therefore that so long as the bed of active material can be built up evenly from the end remote from the inlet end with the space between the spine and the sheath being sufficiently evenly filled on both sides so as not to impair electrical performance, the exact angle at which the plate is disposed whilst filtration filling occurs is not critical.

Thus, whilst it is clearly prudent to maintain the plate at a steeply inclined angle, there is considerable room for variation. The angle will clearly vary depending on the length and diameter of the plate and the size of the spines. Thus, a very narrow annular space is being filled and so long as the maximum horizontal distance from side to side across the inclined tube is not many times, e.g. not more than 10 times the minimum transverse dimension of the tube or envelope, one may anticipate that no significant adverse effect on evenness of filling should arise.

Thus, in general, it may be possible to fill the tubes when they are inclined at angles of as much as 60° to the vertical though angles of up to only 20° to the vertical are probably more prudent.

The invention extends in its broader apparatus scope to a number of additional aspects.

Thus, in one alternative at least two filling stations are provided for each pump and slurry storage tank and the manifolds are fed by a common feed pipe connected from the outlet of the pump to the recirculating pipe and valve means are provided for selectively connecting each manifold to the feed pipe.

In another modification the top clamp comprises a fixed toothed face and a moveable co-operating toothed face arranged to be moved away from the fixed face while remaining parallel thereto by pneumatic or hydraulic means. In addition, in order to assist in liquid flow from tubes, at least one, and preferably both, of the opposed faces of the lower edge of the top clamp or the top edge of the bottom clamp, or preferably both clamps, is chamfered.

The rear face of the top clamp preferably carries a grooved member depending therefrom to assist location of a plate in the clamp.

In one form of the invention the bottom clamp has a front clamp face which hinges down from a back clamp face and biassing means are provided and are arranged to bias the front plate either to the closed position or to a fully open position.

The invention also extends to plant for filling enveloped battery plates which comprises a central slurry preparation station and at least one filling apparatus in accordance with earlier aspects of the invention and means for feeding slurry from the central station to the filling apparatus.

The means for feeding slurry preferably comprise means for continuously feeding slurry to the or each filling apparatus and return means for returning slurry to the central station whereby the slurry can be continuously circulated.

The slurry preparation station preferably comprises a tank, weighing means for enabling the tank to be weighed, agitating means to enable the slurry to be kept in suspension, and active material supply means and liquid supply means.

The weighing means preferably incorporate a load cell located below the tank.

The agitating means preferably comprise a paddle arranged to rotate at the bottom of the tank. The invention also extends to a method of using the plant which comprises continuously feeding slurry from the central preparation tank to each filling apparatus and back to the central tank at a rate such that the contents of the slurry tank of the filling apparatus is replaced at least every hour and preferably at least every half hour and more especially every 5 to 15 minutes.

In another alternative embodiment (not shown) the three filling apparatus arranged around the central slurry preparation station are instead arranged in a straight line with the central station either at the end of the line or in the line between adjacent filling apparatus. Up to six filling apparatus may be supplied with slurry from one central station. The supply pipe 101 and the return pipe 102 in this case are both supplied with a pump e.g. a MONOPUMP and may be constructed of 1 inch internal diameter hose or pipe.

An example will now be given of a specific plate production technique. This example is carried out on the apparatus described with reference to FIGS. 1 to 5.

The plates were positive plates having 15 tubes each 9 inches long. The tubes were made of non-woven polyethylene terephthalate fiber. This is made as follows:

A thin web (1.5 meters wide) of fibers having an average length of 4½ inches is produced by carding, and a fleece is produced by layering approximately 10 webs to form a continuous length of non-woven fabric (also 1.5 meters wide).

The fibers extend generally longitudinally in the web, which is pleated in a zig-zag fashion as it is taken off from a conveyor travelling in the direction of the length of the web onto a conveyor travelling at right angles thereto. Thus the fibers extend substantially transversely to the length of the fleece, but due to the travel of the second conveyor the fibers in adjacent layers are oppositely inclined at a small angle to the transverse direction.

This material is then impregnated with 50% by weight of polyacrylic binder. It has a thickness of 0.5 to 0.7 mm. and weighs 120 to 160 grams/sq.cm.

This material is then converted into an array of tubes by passing two layers of it through a multiple sewing machine to secure the layers together along parallel lines (for example, spaced about 2 to the inch) to form pockets or tubes in the conventional manner.

This material is then dipped in a phenolic resin and dried. The material picks up 30% of phenolic resin based on the dry weight of the non-woven material. After cutting the material to length circular section mandrels 0.287 inches in diameter are then inserted between the rows of stitches to form the pockets. It has an air permeability of 8.0 liters/min/sq.cm. and a water permeability of 1.5 liters/min/sq. cm. area.

This non-woven fabric is made up of randomly entangled individual fibers. The fibers have a diameter of about 25 microns or more broadly 20 to 50 microns. The gaps between individual fibers are in general less than 250 microns and mostly less than 100 microns and moreover the material in having a thickness of 0.5 to 0.7 mms has a three dimensional structure permitting the overlap of many individual fibers in any one path from face to face of the sheet. The material has an excellent filtering activity for use in accordance with the present invention since whilst it permits passage of both liquids and solids in tube shape it rapidly fills with active material when this is fed or poured into the tubes under gravity.

Air permeability was measured as follows:

A sample 2.8 cm. in diameter (6.16 sq. cm. effective cross-sectional area) was clamped in position and the time for 50 l. of dry nitrogen to flow through the sample at 20° C under a presure difference of 0.6 inches (1.5 cm) water gauge was recorded.

The material is too permeable for mercury porosimetry or air flow through an alcohol saturated sample to be accurate measurement techniques.

However, air permeability is known to be an accurate reflection of the filtering capacity of a material and thus materials suitable for use in this invention can be selected by measurement of their air permeability.

Water permeability was measured on the same sample by measuring the time taken for a column of water initially 42 cm. high and 1 liter in volume to flow under gravity through the sample.

The downstream end of the column below the sample was blocked off, the water introduced above the sample and then the downstream end below the sample opened to atmosphere.

The slurry used in this example 1 was made up from a mixture of 1 part grey lead oxide by weight (average particle size 20 microns) and 2 parts red lead oxide by weight (average particle size 5 to 10 microns) mixed in 1.5:1 weight ratio with mains water.

The tank 10 contained 150 kg. of slurry, the paddle 11, 30 inches by 1.5 inches, was rotated at 30 to 70 rpm, to maintain solids in suspension. The pump 16 was run at a volume throughput of 9.5, or more broadly 4 to 10 liters/minute, during recirculation the pressure indicator 22 showed zero pressure. Using the same stirring and pumping conditions, the valve 23 was switched to the fill position. The indicator 22 showed zero pressure for 5 seconds, and 15 psi after a further second when the valve 23 was again switched to recirculation. The internal volume of the tubes was 105 cc.

The volume of slurry passed through the plate was 0.8 liters i.e. the ratio of slurry volume to internal plate volume was 7.6:1.

Flow rates below 4 liters per minute were found to give rather slow filling rates and this reduced the productivity of the process, flow rates above 13 liters per minute were found with these particular cells to give rather low filling weights for the plates.

Thus whilst the slurry is introduced into the top ends of the tubes they fill from the bottom upwards, an oxide layer building up the tube evenly, and water and some oxide emerging through the fabric of the tube mainly at the level of the top surface of the active material in the tube. However, liquid also emerges through the whole filled length of the tube as well, and it is believed that further liquid is forced out of the whole length of the tube once the back pressure starts to build up.

The plate was then dried. The plates were weighed and the weight was 450 ± 20 grams. The plates were then pickled in conventional manner. Numerous plates were made in this way. Some were dissected and weighed, there being no significant weight variation between the top, middle and bottom of the tubes. Others had their electrical characteristics measured and compared with dry powder shaken plates using the same active material. These plates are referred to as standard plates.

The plates in accordance with the present invention had substantially the same discharge duration at the first and also at the tenth discharge in a standard charge/discharge procedure as did the standard plates.

Plates with individual internal tube volumes in the range 50 to 250 cc. can readily be filled.

We have found, as mentioned above, that the degree of densification and thus the total dry fill weight of the tubes can be controlled by control of the pressure which is allowed to build up at the end of the filling period.

Thus using the same slurry and tubes as described above, we have found that if the pressure is only allowed to build up to 5 or 7 psi, the weight is 420 grams ± 5% and if the pressure is allowed to build up to 15 psi, the weight is 450 grams ± 5% and if the pressure is allowed to build up to 35 psi, the weight is 500 grams ± 5%.

Moreover, the tubes are still filled evenly without stratification using these fill weights.

The active material in the tubes at 450 grams filling weight has a density of 4.3 grams/cc.

When this example was repeated using a paste of 3 parts oxide to 1 of water, (which had a density of 3.5 grams/cc), the material was essentially extruded into the tubes which filled in less than 1 second. No significant amount of liquor passed through the tubes, and the plates on testing demonstrated significant stratification of density in the tubes.

EXAMPLES 2 – 27

These were carried out on the apparatus described with reference to FIGS. 1 to 5 using the method described for Example 1.

The tubes were made in the same way as described for the non woven tubes of Example 1 except that they were 14.5 inches long rather than 9 inches long.

The non woven fabric tubes of Example 1 were used for certain of the Examples as indicated by the letters N-W in Tables 1A and 1B and 2A and 2B below. Two other fabrics were also used.

One was a spun wovens fabric, referred to as S.W. in Tables 1A and 1B and 2A and 2B below and having an air permeability (as herein defined) of 6.0 liters/sq.cm./min. It has 17 weft threads per cm and 22 warp threads per cm. The warp threads being about 250 microns in diameter and the weft threads being about 375 microns in diameter. Microscopic examination indicates that the gaps between adjacent warp threads and adjacent weft threads are about 250 microns by 250 microns maximum but these gaps are bridged by numerous loose fibers extending out from the threads. The effective filtering capability of the fabric is thus much enhanced.

The other fabric was a woven fabric, referred to as W., in Tables 1A and 1B and 2A and 2B below and having an air permeability (as herein defined) of 15.2 liters/sq. cm./minute.

It has 18 weft threads per cm and 22 warp threads per cm. The warp and weft threads being about 250 microns in diameter. Microscopic examination indicates that the gaps between adjacent warp threads and adjacent weft threads are about 250 microns by 250 microns and are not occluded by fibers extending out from the threads. The filtering capability of this fabric is thus much less than that of the spun woven fabric.

The compositions used are indicated in Tables 1A and 1B and 2A and 2B below.

The slurry was made from mixtures of grey lead oxide (average particle size 20 microns) and red lead oxide (average particle size 5 to 10 microns) mixed in various weight ratios with mains water.

The solid particles in the slurry were such that less than 1% by weight were above 200 microns, and less than 1% were below 0.001 microns, 95% by weight were less than 50 microns. These particle sizes were determined by sieving.

The tank 10 contains 150 kg of slurry, the paddle 11, 30 inches by 1.5 inches, was rotated at 30 to 70 rpm, to maintain solids in suspension. The pump 16 was run at various volume throughputs as indicated in Tables 1A and 2A. During recirculation the pressure indicator 22 showed zero pressure. Using the same stirring and pumping conditions, the valve 23 was switched to the fill position, and the time for which the indicator 22 showed zero pressure recorded and the total time up to when the valve 23 was again switched to recirculation and the maximum pressure reached recorded. These are given in Tables 1A and 2A. The total internal free volume of the tubes was 170 cc.

Table 3 below gives stratification results for certain of the examples and measurements of the porosity of the acctive material for certain of these examples.

Example 7 concerns the woven tube W. Examples 6, 9, 12, 15, 16, 19, 22 and 23 concern the spun woven tube SW, the remaining examples concern the non-woven tube NW. The tubes in all the Examples fill in the manner described for Example 1, that is the solids are filtered out and the solids level gradually rises up the tubes with the bulk of the liquids issuing from the tubes at the solids level which is current at the moment in question.

Table 1A

| Example | Grey Red | Solids liquids | % Sulphation of the grey oxide | Type of tube | Pump speed | Pump volume cc/sec | Time to start of pressure build up T1 sec. | Theretical volume pumped to start of pressure build up ccs | Total time to end of pressure increase T2 secs. | Time for which pressure applied T2-T1 secs. | Pressure at shut off of valve psi gauge |
|---|---|---|---|---|---|---|---|---|---|---|---|
| 2 | 33:67 | 1.49:1 | zero | NW | 0 | 33 | — | — | 20 | — | 8 |
| 3 | " | 1.46:1 | " | " | 0 | " | 23 | 759 | 31 | 8 | 23 |
| 4 | " | 1.44:1 | " | " | 40 | 122.5 | — | — | 7 | — | 4 |
| 5 | " | 1.42:1 | " | " | " | " | 8 | 980 | 12 | L11 4 | 40 |
| 6 | " | 1.37:1 | " | SW | " | " | 30 | 3675 | 40 | 10 | 20 |

Table 1A-continued

| Example | Grey Red | Solids liquids | % Sulphation of the grey oxide | Type of tube | Pump speed | Pump volume cc/sec | Time to start of pressure build up T1 sec. | Theritical volume pumped to start of pressure build up ccs | Total time to end of pressure increase T2 secs. | Time for which pressure applied T2-T1 secs. | Pressure at shut off of valve psi gauge |
|---|---|---|---|---|---|---|---|---|---|---|---|
| 7 | " | 1.35:1 | " | W | " | failed to fill the solids were not filtered out from the slurry - | | | | | — |
| 8 | " | 0.89:1 | " | NW | " | 122.5 | 19 | 2327 | 35 | 16 | 35 |
| 9 | " | 0.87:1 | " | SW | " | " | 17 | 2082 | 30 | 13 | 30 |
| 10 | " | 0.86:1 | " | NW | " | " | 23 | 2817 | 33 | 10 | 40 |
| 11 | " | 0.71:1 | " | NW | " | " | 16 | 1960 | 24 | 8 | 40 |
| 12 | " | 0.70:1 | " | SW | " | " | 50 | 6125 | 65 | 15 | 7 |
| 13 | " | 0.48:1 | " | NW | " | " | 27 | 3307 | 45 | 22 | 34 |
| 14 | " | 0.31:1 | " | NW | " | " | 65 | 7962 | 110 | 45 | 15 |

Table 1B

| Example | Grey grams | Red grams | Water ml | acid ml | Wet paste in plate grams | Filtrate weight grams | % Settlement Sample | ½life of sample suspension | % Settlement of Filtrate | ½life of filtrate suspension |
|---|---|---|---|---|---|---|---|---|---|---|
| 2 | 18000 | 37000 | 37000 | None | 825 | — | 47.6 (7 days) | — | — | — |
|   |       | 55000 |       |      |     |   |      |   |   |   |
| 3 | 51784 | 35391 | " | " | 900 | — | — | — | — | — |
| 4 | 50884 |   | " | " | 695 | — | — | — | — | — |
| 5 | 50189 |   | " | " | 996 | — | — | — | — | — |
| 6 | 48444 |   | " | " | 810 | — | — | — | — | — |
| 7 | 47634 |   | " | " | — | — | — | — | — | — |
| 8 | 47634 | 53391 | " | " | 926 | — | — | — | — | — |
| 9 | 46708 |   | " | " | 739 | — | — | — | 13 | — |
| 10 | 45969 |   | " | " | 920 | — | — | — | — | — |
| 11 | 45049 | 63391 | " | " | 908 | — | — | — | — | — |
| 12 | 44141 |   | " | " | 636 | — | — | — | — | — |
| 13 | 43505 | 91391 | " | " | 886 | — | — | — | — | — |
| 14 | 20665 | 67340 | " | " | 747 | — | 23.1 (7 days) | — | — | — |

Table 2A

| Example | Grey Red | Solids liquids | % sulphation of the grey oxide | Type of tube | Pump speed | Pump volume cc/sec | Time to start of pressure build up T1 | Theoretical Volume pumped to start of pressure build up ccs | Total time to end of pressure increase T2 | Time for which Pressure applied T2-T1 | Pressure at shut off of valve |
|---|---|---|---|---|---|---|---|---|---|---|---|
| 15 | 66:34 | 2.49:1 | zero | SW | 40 | 122.5 | 2.0 | 245 | 8.0 | 6.0 | 30 |
| 16 | 66:34 | 2.45:1 | — | SW | 40 | 122.5 | 1.5 | 184 | — | — | 2 |
| 17 | 66:34 | 2.00:1 | — | NW | 40 | 122.5 | 3.0 | 368 | — | — | 1 |
| 18 | 66:34 | 1.97:1 | — | NW | 40 | 122.5 | — | — | 7.5 | — | 30 |
| 19 | 66:34 | 1.94:1 | — | SW | 40 | 122.5 | — | — | 7.0 | — | 30 |
| 20 | 66:34 | 1.11:1 | — | NW | 40 | 122.5 | 6.0 | 735 | 10.5 | — | 35 |
| 21 | 66:34 | 1.08:1 | — | NW | 40 | 122.5 | 7.0 | 858 | — | — | 1 |
| 22 | 66:34 | 1.07:1 | — | SW | 40 | 122.5 | 12 | 1470 | 21 | 9 | 30 |
| 23 | 66:34 | 1.05:1 | — | SW | 40 | 122.5 | 11.7 | 1433 | — | — | 1 |
| 24 | 66:34 | 0.54:1 | — | NW | 40 | 122.5 | 14 | 1715 | 27 | 13 | 29 |
| 25 | 66:34 | 0.53:1 | — | NW | 40 | 122.5 | 11.7 | 1433 | — | — | 1 |
| 26 | 100:0 | 1.65:1 | — | NW | 40 | 122.5 | 4 | 490 | 8.2 | 4.2 | 35 |
| 27 | 100:0 | 1.60:1 | — | NW | 40 | 122.5 | 4 | 490 | — | — | 1 |

Table 2B

| Example | Grey grams | Red grams | Water ml | acid ml | Wet paste in plate grams | Filtrate weight grams | % Settlement Sample | ½life of sample suspension mins | % Settlement of Filtrate | ½life of filtrate suspension mins |
|---|---|---|---|---|---|---|---|---|---|---|
| 15 | 64333 | 25879 | None | 906 | 1009 | — | — | — | — | — |
| 16 | 63427 | 25879 | " | 520 | 120 | — | — | — | — | — |
| 17 | 61660 | 30879 | " | 685 | 284 | 93 | — | 78 | 12 mins | |
| 18 | 60025 | 30403 | " | 950 | — | — | — | — | — | |
| 19 | 59075 | 30403 | " | 965 | — | — | — | — | — | |
| 20 | 57240 | 51403 | " | 957 | 332 | 68 | 13 | 48 | 5.5 | |
| 21 | 54931 | 50758 | " | 662 | 747 | — | — | — | — | |
| 22 | 54269 | 50758 | " | 885 | — | — | — | — | — | |
| 23 | 53384 | 50758 | " | 633 | 1504 | — | — | — | — | |
| 24 | 52751 | 97758 | " | 970 | — | 31 | 2.5 | 19 | 0.5 | |
| 25 | 51333 | 96929 | " | 489 | 674 | — | — | — | — | |
| 26 | 33000 | 20000 | " | 932 | 523 | 86 | 12 | — | — | |
| 27 | 30428 | 19005 | " | 632 | 463 | 73 | — | 22 | 0.5 | |

TABLE 3

| Example | Grey red | Solids liquids | % sulfation of the grey oxide | Stratification Top D | middle C | B | bottom A | A - D | Mean | % deviation | 1 | 2 | 3 | 4 | Mean | % deviation |
|---|---|---|---|---|---|---|---|---|---|---|---|---|---|---|---|---|
| 15 | 66:34 | 2.49:1 | none | 271 | 268 | 277 | 279 | + 8 | 274 | ± 2% | 272 | 280 | 279 | 276 | 277 | ± 2% |
| 18 | 66:34 | 1.97:1 | none | 291 | 288 | 295 | 288 | − 3 | 291 | ± 1% | 288 | 299 | 295 | 289 | 293 | ± 2% |
| 19 | 66:34 | 1.44:1 | none | 299 | 290 | 294 | 295 | −4 | 295 | ± 1.5% | 296 | 299 | 299 | 296 | 298 | ± 0.7 |
| 20 | 66:34 | 1.11:1 | none | 309 | 305 | 293 | 290 | −19 | 299 | ± 3% | 299 | 302 | 307 | 298 | 302 | ± 1.7 |
| 22 | 66:34 | 1.07:1 | none | 278 | 282 | 279 | 276 | − 2 | 279 | ± 1% | 280 | 281 | 282 | 282 | 281 | ± 0.4 |
| 24 | 66:34 | 0.54:1 | none | 314 | 304 | 296 | 289 | −25 | 301 | ± 4% | 300 | 307 | 303 | 302 | 303 | ± 1.3 |
| 26 | 100:0 | 1.65:1 | none | 283 | 280 | 278 | 273 | −10 | 279 | ± 2% | 280 | 282 | 281 | 280 | 281 | ± 0.4 |

Notes on Table 1A and 1B and 2A and 2A and 2B and Table 3.

1. Solid/liquid ratios.
   A. The weights of solids removed in the samples of the filtrates have been ignored since the weights of these samples were relatively small and there was no way of easily determining the ratio of solids to liquids in the filtrates.
   B. The ratios have been calculated ignoring the amount of liquids removed in the paste in the tubes. These ratios therefore slightly underestimate the solids content of the slurries.
2. Grey/red ratios. These have been assumed to remain constant except when extra grey or red oxide is added.
3. Wet paste in plate. The weight of the fabric tube, the lead spines and a bottom bar was 645 grams. The values quoted are the wet filled plate plus a loose bottom bar minus 645.
4. % Settlement of the sample. This is the height A of the solids in the container divided by the height B of the liquids from the bottom of the container expressed as a percentage after the sample had been thoroughly shaken for ½ minute and then allowed to settle in a vertical position for 24 hours.

The container is a round bottomed test tube of 1.5 cms internal diameter and at least 9 cms of slurry are placed in the test tube.

5. ½ life of the suspension. This is the time taken for the solids level of the sample in the container described under (5) above to sink to halfway between B and A.

The test is carried out by placing a rubber band with its bottom edge at the halfway level i.e. (B + A) / 2 cms from the bottom of the test tube, shaking the tube vigorously for at least ½ minute or until all the solids are displaced from the bottom of the test tube and then righting the test tube and measuring the time from that instant to the instant when light is first visible under the rubber band.

6. Pump speed. This is merely a setting. The volume of slurry pumped through the manifold was measured at varying settings by collecting the slurry as it came out of the manifold. Two measurements were made for each pump setting. The volume of slurry was measured.

A graph was then plotted for the 0, 20, 30 and 40 pump settings of volume against time in seconds (using a stop watch). A reasonable straight line plot was obtained.

7. Time to start of pressure build up. This is the time between the inlet valve being opened and the pressure gauge actually starting to move rather than merely flicker.

8. Theoretical volume pumped to start of pressure build-up. This is the time under the eight column from the left of tables 1A, 2A, 11A, 12A and 13A multiplied by the volume reading under the seventh column from the left of tables 1A, 2A, 11A, 12A and 13A and is purely theoretical.

9. Stratification. (Table 3) This is determined by pickling the plates in 1.40 specific gravity sulphuric acid for 6 hours followed by drying at 180° F for 12 hours.

The top bar and the bottom bar were then cut off the plate and the remainder cut into four equal horizontal strips labelled A B C and D with A at the bottom bar end of the plate. These were then weighed. The horizontal strips were then cut into four sections of three tubes each leaving out every fourth tube and labelled 1 to 4 with a 1 at the lug side of the plate. The four sections 1 from each of the horizontal strips was then weighed and the value given under 1 in Table 6 is this value. The other vertical sections 2, 3 and 4 were weighed in the same way.

10. Pencil porosity. (Table 5) This is determined by the well known technique of mercury intrusion porosimetry and is done on the same samples as Table 3. Details of this technique are given in British Patent Specification No. 1,331,257 (EPS 61).

The rotating vane viscometer values for certain of the slurries used in the above examples are given below in Table 4.

Figure 7:
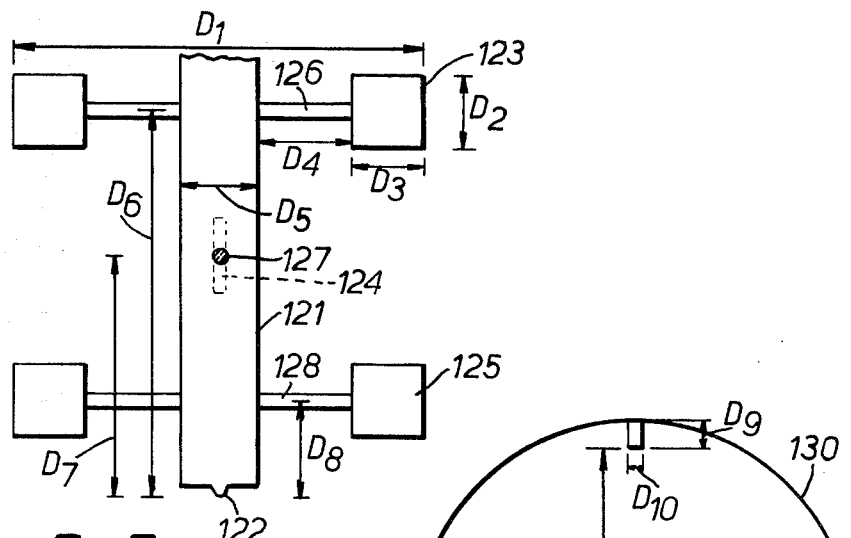
FIG. 7 is a detailed front elevational view of the paddle assembly of the viscometer of FIG. 6.

The viscometer used is illustrated in FIGS. 6, 7 and 8.

The apparatus consists of a frame 110 carrying an electric motor 111 driving a paddle assembly 120 via a gear box 112 and a torque transducer 119. The speed in the gear box 112 is sensed by a tachogenerator 113 the output of which is fed to a digital voltmeter 113A. The voltage signal produced by the torque transducer is fed to a chart recorder 114. The recorder has a variable chart speed and a variable arc.

A sample container 130 is clampably supported on an adjusted table 115 which can be raised and lowered on guides 116 by a pneumatic cylinder 117.

The sample container 130 has a detachable lid 131 located above the paddle assembly 120. The lid can be secured to the container by an external bayonet lock (not shown).

The paddle assembly 120 is removably attached to the output shaft 118 of the gear box 112, and consists of a central rod 121 having a lower boss 122 which in use nests in a hole 132 in the bottom of the container 130. The rod 121 has a diameter D5 of 1.3 cms and carries three pairs of paddles 123, 124 and 125. The paddles 123 and 125 are in the same plane and are at right angles to the paddles 124. All the blades of the paddles are vertical and thus parallel to the axis of the rod 121. The paddles are carried on arms 126, 127 and 128. The distance D6 from the center of the arm 126 to the boss 122 is 6.5 cms, the distance D7 from the center of the arm 127 to the boss 122 is 3.9 cms and the distance from the center of the arm 128 to the boss 122 is 1.6 cms. The width of each paddle D3 is 1.2 cms and its height D2 is 1.2 cms and its thickness 0.1 cm. The distance D4 from the inside edge of each paddle to the surface of the rod 121 is 1.5 cms.

The distance D1 between the outside edges of the paddles in a pair of paddles is 6.8 cms.

The internal height of the container 130 is 8.2 cms and its internal diameter is 8.8 cms. There re four internal baffles 135 located at the end, of diameters at right angles to each other. The thickness D10 of each baffle 135 is 0.30 cms and its inward extent D9 is 0.5 cms. The separation D11 of the baffles on a diameter is 7.65 cms. Each baffle extends the full height of the container.

The container and baffles are made of smooth stainless steel.

The apparatus is used as follows:

The container is filled to a depth of 8.2 cms with the material under test and raised into position, clamped to the table 115 and the lid 131 secured.

The chart recorder 114 is started and the motor 111 is then started with the gearing set for a low shear rate e.g. 6 rpm. The start up torque and steady state torque are detected by the torque transducer 119 and the motor and recorder run until a steady torque value has been recorded for at least 2 minutes. This is the steady state torque value. The torque value at the steady state is quoted and if an initial peak was present this fact is noted. The sample is then removed, shaken with the bulk of the material being measured and the container refilled. The measurement is then repeated at a higher shear rate e.g. 18 rpm. The cycle is repeated for as many shear rates as desired.

The background torque value namely with the container 130 empty was found to be 0.004 lbs ft at all the shear rates quoted in Table 2. The same value was obtained when the container was filled with water.

The rotating vane viscometer torque value as defined herein is the value of the steady state torque value of the sample measured in the above described manner on the above described machine at a shear rate of 6 revolutions of the paddles per minute at ambient temperature of 20° C. minus the background value at 20° C.

same as the background value. Thus their observed torque value is not greater than the background value in the measurement carried out and they fulfil the preferred viscosity characteristic of having a torque value (as defined herein) of less than 0.006 lbs. ft. at 20° C.

TABLE 5

| Example | 18 | 20 | 24 |
|---|---|---|---|
| Pores between | porosity (%) provided by pores having such dimensions | | |
| 100 – 50 microns | 0.9 | 0.7 | 0.6 |
| 50 – 25 microns | 0.8 | 0.4 | 0.4 |
| 25 – 12.5 microns | 0.2 | 0.1 | 0.2 |
| 12.5 – 6.4 microns | 0.2 | 0.1 | 0.2 |
| 6.4 – 3.2 microns | 0.1 | 0.1 | 0.1 |
| 3.2 – 1.6 microns | 0.4 | 0.3 | — |
| 1.6 – 0.8 microns | 0.2 | 0.1 | 0.5 |
| 0.8 – 0.4 microns | 1.3 | 1.1 | 2.3 |
| 0.4 – 0.2 microns | 3.3 | 4.9 | 4.9 |
| 0.2 – 0.1 microns | 5.5 | 4.6 | 4.1 |
| 0.1 – 0.05 microns | 3.3 | 3.2 | 3.6 |
| 0.15 – 0.035 microns | 0.8 | 0.9 | 0.9 |
| below 0.035 microns | 2.1 | 1.0 | 1.2 |
| Total porosity | 19.1 | 17.5 | 19.0 |
| Apparent density | 5.5 | 5.6 | 5.4 |
| True density | 6.8 | 6.7 | 6.7 |

We have found that at ratios of oxides to water above 2.5:1 the filtration process does not occur and the process is much more difficult to control. Thus there is a tendency for the plates to become overfilled and too dense and for the tubes to be filled unevenly large pockets and gaps being liable to occur and also regions of lower density distributed unevenly through the plate.

At ratios of oxides to water below 0.4 to 1 the time taken to fill the plate becomes excessively long and the weight of oxides which can be introduced with the tubes tends to fall to unacceptably low values.

Thus it is preferred for the weight of wet paste in the plates used in Examples 2 to 27 to be at least 800 grams preferably in the range 800 to 950 grams.

As can be seen from Tabe 4 the viscosity of the aqueous slurries used in accordance with the present invention are all very low and are substantially the same as that of water as compared with the viscosity of conventional battery pastes and the paste of Example 1 of Ger- Table 4

| Example | Grey red oxide | solids liquids | % Sulphation of grey oxide | Rotating vane viscometer | | |
|---|---|---|---|---|---|---|
| | | | | Shear rate rpm | torque lbs ft | presence of peak |
| Comparison Example 1 of German Ausle-geschrift 2243377 | 75:25 | 2.90:1 | 12.6% | 6 | 3.47 | Yes |
| 2 | 33:67 | 1.49:1 | none | 6 | 0.005 | No |
| | | | | 42 | 0.004 | No |
| 17 | 66:34 | 2.00:1 | none | 6 | 0.008 | No |
| 24 | 66:34 | 0.54:1 | none | 6 | 0.004 | No |
| 26 | 100:1 | 1.65:1 | none | 6 | 0.006 | No |
| | | | | 24 | 0.005 | No |
| | | | | 42 | 0.005 | No |

The viscosity values quoted herein are used to characterise the slurries as being readily pourable and of low viscosity. The values quoted in Tables 4, 7, 10 and 15 are the observed values and are not the torque values (as defined herein) which are used to characterise the preferred slurries. It will be appreciated that to convert the observed torque values of Tables 4, 7, 10 and 15 to the torque values (as defined herein) the background value of 0.004 should be subtracted from the observed values. Certain examples, e.g. 2 and 24 in Table 4 and 17, 26, 34, 54, 55 and 56 in Table 15 have values the man Auslegeschrift No. 2,243,377. Thus as compared with a rotating vane viscometer torque value for the German specification of 3.5 lbs. ft. typical pourable self levelling slurries of the present invention have values below 0.010 lbs. ft. and more especially not more than 0.080 lbs. ft.

EXAMPLES 28 to 33

These are samples of high viscosity mixtures and are given by way of comparison only and are not in accordance with the present invention.

These are examples of the use of formulations which have a rotating vane viscometer torque value (as herein defined) of 0.006 lbs. ft. and above. Examples 28 to 32 were carried out on the apparatus of FIGS. 1 to 5. Example 33 was carried out on the apparatus of FIGS. 10 to 19. This apparatus differs from the earlier apparatus only in the rate of delivery of the monopump, the use of a preset pressure responsive switch which automatically cuts off the supply of slurry as soon as the pressure in the supply tubes to the manifold reaches a preset value and in certain engineering features.

The proportions of ingredients and the conditions used for these examples are given in tables 6A and 6B below.

The viscosities of the formulations used are given in table 7 and the stratification results for Example 33 in table 8.

None of these formulations filled by the filtration filling technique, they all filled from the inlet end downwards. Some formulations, such as example 30, were too thick for them even to be capable of being pumped intothe tubes. In example 31 not all the tubes filled properly. As can be seen from table 8, the density of the active material in the plate of Example 33 varied by considerableamounts namely ±20% compared with the maximum variation in table 3 of ±4%.

We have also found that use of these higher viscosity pastes tends to introduce problems of occasional blocking of the machinery during use.

Table 6A

| Example | Grey Red | Solids liquids | % Sulphation of the grey oxide | Type of tube | Pump speed | Pump volume cc/sec | Time to start of pressure build up T1 secs. | Theoretical volume pumped to start of pressure build up ccs | Total time to end of pressure increase T2 secs. | Time for which pressure applied T2 - T1 secs. | Pressure at shut off of valve psi gauge |
|---|---|---|---|---|---|---|---|---|---|---|---|
| 28 | 75:25 | 3:1 | none | NW | 40 | 122.5 | 1 – 2 | — | — | — | 30 |
| 29 | 66:34 | 2.57:1 | none | NW | 40 | 122.5 | 2 | 245 | 6.0 | 4.0 | 40 |
| 30 | 75:25 | 2.86:1 | 3.75 | NW | 40 | — | too thick to get into the tubes at all | | | | |
| 31 | 75:25 | 0.70:1 | 9 | NW | 20 | 78 | — | — | 9 | — | 50 |
| 32 | 66:34 | 0.73:1 | 9 | NW | 40 | 122.5 | 3 | 368 | 9 | 6 | 40 |
| 33 | 100:0 | 0.9:1 | 17 | NW | 40 | 200 | 1 | — | 3 | 2 | 20 |

Table 6B

| Example | Grey grams | Red grams | Water ml | acid ml | Wet paste in plate. weight grams | Filtrate Settlement grams | % pension Sample | ½life of sample suspension mins | % Settlement pension Filtrate | ½ life of filtrate suspension mins |
|---|---|---|---|---|---|---|---|---|---|---|
| 28 | — | — | — | — | — | — | — | — | — | — |
| 29 | 66384 | | 25879 | — | 1089 | 228 | 98 | — | 62 | 10 |
| 30 | 45000 | 15000 | 20000 | 1000 | — | — | not self levelling | | — | — |
| 31 | | 42388 | 58428 | 2000 | 567 | — | — | — | — | — |
| 32 | 35669 | 18266 | 71996 | 2000 | 661 | — | 76 | 7.5 | — | — |
| 33 | 87131 | | 90900 | 7000 | 272 | — | 91 | | — | — |

TABLE 7

| | | | | rotating vane viscometer | | |
|---|---|---|---|---|---|---|
| Example | Grey Red oxide | Solids liquids | % Sulphation of grey oxide | Shear rate rpm | Torque lbs ft | presence of peak |
| Comparison Example 1 of German Auslegeschrift 2243377 | 75:25 | 2.90:1 | 12.6 | 6 | 3.47 | Yes |
| 28 | 75:25 | 3.30:1 | none | 6 | 0.014 | |
| 29 | 66:34 | 2.57:1 | none | 6 | 0.017 | |
| 30 | 75:25 | 2.86:1 | 3.75 | 6 | 0.066 | |
| 31 | 75:25 | 0.70:1 | 9 | 6 | 0.012 | |
| 32 | 66:34 | 0.73:1 | 9 | 6 | 0.010 | |
| 33 | 100:0 | 0.90:1 | 17 | 6 | 0.010 | no |

FOOTNOTE:
As to the viscosity values see general statements under Table 4.

TABLE 8

| Example | Grey red | Solids liquids | % Sulphation of grey oxide | Stratification Top D | middle C | B | bottom A | A - D | Mean | % deviation | 1 | 2 | 3 | 4 | Mean | deviation |
|---|---|---|---|---|---|---|---|---|---|---|---|---|---|---|---|---|
| 33 | 100:0 | 0.9:1 | 17 | 44 | 50 | 61 | 65 | 21 | 55 | +18 −20 | 46.5 | 43 | 29.5 | 40 | 39.75 | +16 −26 |

It has been mentioned above that other electrochemically active materials besides lead acid active materials can be used with the process of this invention.

Clearly the components used in such alternative arrangements must be compatible with each other. Thus, for example, when alkaline negative active materials are to be used the spines should be made of a metal having adequate chemical corrosion resistance to the alkaline environment, e.g. steel current collecting spines of round or strip section could be used, and these may be nickel plated and the polyester fabric tubes could be replaced by polyamide, e.g. nylon, fabric tubes. Preferred examples of alkaline electrochemically active materials include nickel hydroxide for the positive plate and cadmium hydroxide for the negative plate. These typically contain a proportion of electrically conductive material, e.g. graphite sufficient to ensure adequate conductivity; preferably 5 to 15% by weight of graphite is used. Steel may be used as the current collecting element and can also be used as the envelope for the active material in a suitable porous form to enable the filtration filling to be achieved. Other alkaline electrochemically active materials include iron oxide for the negative active material.

The nickel hydroxide may also have nickel particles or flakes distributed through it to enhance its conductivity. The iron oxide may also have conductive materials incorporated in it to improve its conductivity.

The electrolyte is typically aqueous potassium hydroxide which may contain a small proportion of lithium hydroxide.

A variety of lead acid electrochemically active materials have already been mentioned including grey lead oxide and red lead oxide. Grey lead oxide comes in a variety of forms having different contents of lead and lead monoxide (PbO) and particle sizes depending on the method by which it is made. Hardinge oxide which is made by ball milling lead billets has a lead content of about 20-40%, e.g. 30% and a PbO content of about 80-60%, e.g. 70%.

It is subjected to air classification, the coarser particles being returned for regrinding. It has an average particle size of 15 to 25 preferably 20 microns.

Tudor oxide is another oxide which is made by milling but this is not subjected to air classification it has an average particle size of 30 to 50, preferably 40, microns.

Oxide produced by the roasting process (e.g. the Barton pot process) has an average particle size of 12-15 microns.

The invention in enabling chemically inert envelopes to be used does not preclude the filling of the tubes with metallic forms of the active materials and their chemical or electrolytic conversion to electrochemically active form within the envelope and thus in its broadest aspect includes such an arrangement. The term active material composition thus includes materials capable of being converted to electrochemically active form within the porous envelope either before assembly into the cell or after assembly into the cell.

Many other electrochemically active couples exist which have been proposed for use in batteries.

The process has been described with reference to secondary or rechargeable systems so far. It is, however, equally applicable to primary battery systems where the active materials or one of them can be enclosed in a porous envelope and can be introduced into the envelope as a liquid suspended, preferably aqueous, slurry.

The liquid used as the suspension agent in the slurry is most readily aqueous and this is clearly preferred on grounds of cost, safety and inertness. However, if an aqueous vehicle would introduce problems it could be replaced by any other liquid vehicles appropriate to the active material being used. Examples of other battery systems with which the process could be used are thus listed in the following Table 9.

The active materials listed below would be used in particulate form of particle size appropriate to achieve filtration filling with the porous envelope which would be used.

TABLE 9

| Battery System | Positive Electrode | Negative Electrode | Electrolyte | Primary or Secondary | Comments |
|---|---|---|---|---|---|
| A | Zinc | Carbon | Ammonium chloride or potassium hydroxide | Primary | |
| B | Zinc | Carbon catalysed with noble metals or base metals such as copper | " | " | |
| C | Zinc | Manganese oxide/carbon blends with a carbon current collector rod | Ammonium chloride | " | |
| D | Zinc | " | Potassium hydroxide | Secondary | |
| E | Zinc | Graphite catalysed with noble metals or base metals such as copper | " | Primary | Air is passed through the negative electrode where it is ionized |
| F | Iron | As in E | As in E | As in E | As in E |
| G | Cadmium | " | " | " | " |
| H | Magnesium | Manganese dioxide/carbon blends with carbon current collector rod | Potassium hydroxide Potassium chromate Potassium chlorate | " | |
| I | Mercurous oxide (HgO) | Cadmium | Aqueous potassium hydroxide | " | |
| J | Nickel | Graphite catalysed with noble metals or base metals such as copper | Potassium hydroxide | Secondary | The electrodes are housed in a sealed container which is saturated with hydrogen gas. The electrodes use up hydrogen during discharge and give off hydrogen during operation |

Experiments have shown that nonwoven tubular plates can be filled by the filtration filling process using either positive alkaline active material or negative alkaline active material.

Thus we have found that conventional negative alkaline active material (containing by weight 76% cadmium hydroxide 5% cadmium metal, 15% iron oxide, 2% graphite and 2% paraffin) can be introduced under gravity alone into the same non woven, NW, tubular plates as were used in Examples 2 to 27. We have found that active material to water ratios in the range 0.75:1 down to 0.2:1 produce slurries which fill from the bottom end of the tubes back up to the inlet with good even distribution of active material in the tubes. The solids in these slurries settle out relatively rapidly in similar manner to the lead acid slurries described above and are all readily pourable liquids.

Similarly conventional positive alkaline active material compositions (containing by weight 85% nickel hydroxide and 15% graphite (a blend of powdered graphite and flake graphite)) when used in the same ratios of solids to liquids, produce slurried which fill from the bottom ends of the tubes back up to the inlet with good even distribution of the active material in the tubes.

The solids in these slurries again settle out relatively rapidly in similar manner to the lead acid slurries described above and are all readily pourable liquids.

Experiments on the application of pressure to the slurry indicated that the amount of active material introduced into the tubes could be increased by the application of pressure in a way similar to that demonstrated above in connection with lead acid active materials.

Another factor which must be born in mind if one is to achieve successful filtration filling is the relationship between the slurry particle size and the permeability, structure and pore dimensions, i.e. filtering capability, of the material from which the porous envelope is made. Thus with a highly porous envelope such as the woven envelope described in connection with Examples 2 to 27 in particular, the mixture of 33:67 Hardinge grey oxide to red lead oxide, which has a relatively low particle size, at a solids to liquids ratio of only 1.35:1, as under Example 7; failed to fill the woven plate, the bed of active material failing to build up inside the tubes.

However, when 100% grey Tudor oxide, of average particle size 40 microns, at solids to liquids ratios in the range 2.5:1 is used these woven tubes, W, can be filtration filled satisfactorily. These tubes can also be filled satisfactorily using this range of solids to liquids ratios for slurries in which the Tudor oxide to red lead oxide ratios are 80:20, 60:40, 40:60, and 20:80.

These tubes can also be filled with Hardinge oxide and 80:20 Hardinge oxide to red lead oxide mixtures at these solids to liquids ratios.

The invention has been described so far with reference to non acidified lead acid active materials. However, lead acid active materials can also be used which have had acid added to them to at least partially sulphate them.

We have observed that the addition of acid has a pronounced effect on the viscosity of the slurry within certain degrees of sulphation.

The reason for this effect is not known for certain and whilst the invention is not dependant on any particular theory it is thought that this may be due to variations in the degree of hydration and thus intramolecular or intraparticulate interactions with variation in the amount of intermediate sulphate compounds which may be present in the acidified slurries. The figures for rotating vane viscometer torque values given in table 10 below clearly demonstrate this variation in viscosity with variation of degree of sulphation.

Care must thus be taken to use a system, in which the solids to liquids ratio is kept sufficiently low, so that the percentage sulphation used does not cause the slurry, when used with the particular fabric envelope involved, to fail to filtration fill.

We have also found that, at least when using the non woven fabric NW described above with a wide range of lead acid slurries, slurries which have a rotating vane viscometer torque value (as herein defined) of less than 0.006 lbs. ft. at 20° C appear to fill the filtration filling whilst slurries having such values of 0.006 and above fill by injection filling. Thus, though the invention in its broadest aspects is not limited to the use of slurries having torque values below 0.006, the use of such slurries is very much preferred.

We give certain illustrative non-limiting examples of acidified slurry formulations which filtration fill in the following Examples 34 to 42.

1 gram of lead oxide requires 0.4 mls of 1.4 specific gravity sulphuric acid to achieve 100% sulphation.

With grey lead oxide containing 30% lead and 70% lead oxide the degree of sulphation Y is given by the equation:

$$Y = 216.4 \times \frac{\text{volume of 1.4 sp.gr. } H_2SO_4 \text{ in liters}}{\text{weight of grey lead oxide in Kilogrammes}}$$

EXAMPLES 34 to 42

These were carried out on the apparatus described with reference to FIGS. 1 to 5.

The proportions used and conditions and results are given in Table 11A and 11B below. These examples all use 100% Hardinge oxide with solids to liquids ratios of 1.28:1 down to 0.43:1 and non-woven tubes.

It will be observed that with these acidified slurries somewhat lower values are obtained for the wet paste in the plate as compared with the non acidified slurries of Examples 1 to 27. However, as can be seen from Table 14 below, the active material in the tubes is merely of lower density and possesses good distribution and no harmful stratification.

The viscosities of slurries used in Examples 34 and 38 are given in Table 15.

TABLE 10

| Slurry Example No. | Weight of solids grams | Volume of water cc | Volume of 1.4 sp.g. $H_2SO_4$ cc | Solids Liquids | % sulphation | Viscosity lbs.ft. at 20° C at varying r.p.m. 6 | 24 | 42 | Presence of Peak |
|---|---|---|---|---|---|---|---|---|---|
| 10.1 | 2000 | 667 | 0 | 3:1 | 0 | 0.011 | | | Yes |
| 10.2 | " | 536 | 152 | 3.1 | 20 | 0.884 | | | Yes |
| 10.3 | " | 410 | 306 | 3.1 | 40 | 2.604 | | | Yes |
| 10.4 | " | 284 | 458 | 3:1 | 60 | 3.65 | | | Yes |

TABLE 10-continued

| Slurry Example No. | Weight of solids grams | Volume of water cc | Volume of 1.4 sp.g. $H_2SO_4$ cc | Solids Liquids | % sulphation | Viscosity lbs.ft. at 20° C at varying r.p.m. 6 | 24 | 42 | Presence of Peak |
|---|---|---|---|---|---|---|---|---|---|
| 10.5 | " | 160 | 612 | 3:1 | 80 | 0.539 | | | Yes |
| 10.6 | " | 134 | 764 | 3:1 | 100 | 0.353 | | | Yes | note:
the volume of water added took into account the water present in the sulphuric acid and the water liberated by the reaction of $H_2SO_4$ with PbO to produce $PbSO_4$
FOOTNOTE:
As to the viscosity values see general statements under Table 4.

TABLE 11A

| Example | Grey Red | Solids Liquids | % sulphation | Type of tube | Pump speed | Pmp Volume cc/sec | Time to start of pressure build up T1 | Theoretical volume pumped to start of pressure build up ccs | Total time to end of pressure increase T2 | Time for which pressure applied T2 - T1 | Pressure at shut off of valve |
|---|---|---|---|---|---|---|---|---|---|---|---|
| 34 | 100/0 | 1.28:1 | 1.5 | NW | 40 | 122.5 | 3 | 348 | 7 | 4 | 40 |
| 35 | 100/0 | 1.24:1 | 1.5 | NW | 40 | 122.5 | 3 | 368 | — | — | 1 |
| 36 | 100/0 | 0.82:1 | 1.5 | NW | 40 | 122.5 | 4 | 490 | 12 | 8 | 38 |
| 37 | 100/0 | 0.79:1 | 1.5 | NW | 40 | 122.5 | 4 | 490 | — | — | 1 |
| 38 | 100/0 | 0.47:1 | 1.5 | NW | 40 | 122.5 | 7 | 858 | 19 | 12 | 24 |
| 39 | 100/0 | 0.46:1 | 1.5 | NW | 20 | 78 | 12 | 936 | 30 | 18 | 30 |
| 40 | 100/0 | 0.44:1 | 1.5 | NW | 20 | 78 | 12 | 936 | — | — | 1 |
| 41 | 100/0 | 0.43:1 | 4.0 | NW | 40 | 122.5 | 6 | 735 | 14.5 | 8.5 | 35 |
| 42 | 100/0 | 0.42:1 | 4.0 | NW | 20 | 78 | 10 | 780 | 25 | 15 | 32 |

TABLE 11B

| Example | Grey grams | Red grams | Water ml | acid ml | Wet paste in plate grams | Filtrate Weight grams | % Settlement Sample | ½ life of sample suspension | % Settlement of Filtrate | ½ life of filtrate suspension |
|---|---|---|---|---|---|---|---|---|---|---|
| 34 | 29796 | — | 23005 | 200 | 892 | — | 79.6 | — | — | — |
| 35 | 27809 | — | 22186 | 200 | 489 | 83 | 79.6 | — | 56.0 | — |
| 36 | 25181 | — | 31313 | 200 | 883 | — | 68.4 | — | — | — |
| 37 | 24898 | — | 31313 | 200 | 524 | 366 | 68.4 | — | 47.6 | — |
| 38 | 24374 | — | 51313 | 200 | 779 | — | 57.6 | — | — | — |
| 39 | 23180 | — | 50439 | 200 | 861 | — | 57.6 | — | — | — |
| 40 | 22319 | — | 50439 | 200 | 493 | 1948 | 57.6 | — | 32.8 | — |
| 41 | 21826 | — | 50439 | 200 | 720 | 2190 | 59.6 | — | 25.0 | — |
| 42 | 20702 | — | 49703 | 200 | 732 | 2156 | — | — | 29.3 | — |

Examples 43 to 50

These were carried out on the apparatus described with reference to FIGS. 1 to 5.

The proportions used, conditions and results for these examples are given in Table 12A and 12B below. These Examples use high proportions of red lead with solids to liquids ratios of about 1.6:1 and non-woven tubes, NW.

Stratification results are given in Table 14.
The viscosities of slurries used in Examples 44, 47, 48 and 50 are given in Table 15.

The degree of sulphation quoted in Table 12A has been obtained merely by replacing the weight of grey lead by the weight of red lead. The slurries of Examples 47 to 50 were made up by adding grey lead oxide to the slurry of Example 46.

TABLE 12A

| Example | Grey Red | Solids Liquids | % Sulphation | Type of tube | Pump speed | Pump volume cc/sec | Time to start of pressure build up T1 | Theoretical volume pumped to start of pressure build up ccs | Total time to end of pressure increase T2 | Time for which pressure applied T2 - T1 | Pressure at shut off of valve |
|---|---|---|---|---|---|---|---|---|---|---|---|
| 43 | 0/100 | 1.63:1 | 0.07 | NW | 40 | 122.5 | 28 | 3430 | 44.5 | 16.5 | — |
| 44 | 0/100 | 1.59:1 | 0.18 | NW | 40 | 122.5 | no pressure build-up | — | 26.5 | — | — |
| 45 | 0/100 | 1.55:1 | 0.18 | NW | 40 | 122.5 | 34 | 4165 | 66 | 22 | 5 |
| 46 | 0/100 | 1.50:1 | 0.77 | NW | 40 | 122.5 | 17 | 2083 | 47.5 | 30.5 | 15 |
| 47 | 9.9/90.1 | 1.62:1 | 0.72 | NW | 40 | 122.5 | 8 | 980 | 26.5 | 18.5 | 20 |
| 48 | 18.6/81.4 | 1.68:1 | 0.72 | NW | 40 | 122.5 | 5 | 613 | 12 | 7 | 30 |
| 49 | 18.6/81.4 | 1.63:1 | 0.72 | NW | 40 | 122.5 | 5 | 613 | 12 | 7 | 30 |
| 50 | 18.6/81.4 | 1.59:1 | 0.72 | NW | 40 | 122.5 | — | — | 15 | — | 40 |

TABLE 12B

| Example | Grey grams | Red grams | Water ml. | acid ml | Wet paste in plate grams | Fil-Filtrate weight grams | % Settlement sample | ½ life of sample suspension | % settlement of filtrate | ½ life of filtrate suspension |
|---|---|---|---|---|---|---|---|---|---|---|
| 43 | — | 31334 | 19263 | 10 | 882 | — | 62 | 9 | — | — |
| 44 | — | 30452 | 19263 | 25 | 528 | — | — | 15 mins 40 Secs. | — | — |
| 45 | — | 28734 | 18509 | 25 | 799 | — | — | — | — | — |
| 46 | — | 27935 | 18509 | 100 | 717 | — | — | — | — | — |
| 47 | 3000 | 27218 | 18509 | 100 | 788 | 3055 | 73 | 6 | — | — |
| 48 | 5799 | 25398 | 18509 | 100 | 784 | 2202 | 87 | 5 | — | — |
| 49 | 5241 | 22954 | 17186 | 100 | 723 | — | — | — | — | — |
| 50 | 5107 | 22365 | 17186 | 100 | 818 | — | — | — | — | — |

Examples 51 to 56

These were carried out on the apparatus described with reference to FIGS. 9 to 18.

The proportions used, conditions and results for these examples are given in Tables 13A and 13B below. These examples use high proportions of grey lead oxide and higher degrees of sulphation than Examples 34 to 42, with non-woven tubes.

Stratification results are given in Table 14 and the viscosities of slurries used in Examples 51, 54, 55 and 56 are given in Table 15.

TABLE 15

| Example | Grey Red Oxide | Solids Liquids | % sulphation | Rotating vane viscometer Shear rate rpm | Torque lbs. ft | presence of peak |
|---|---|---|---|---|---|---|
| 34 | 100:1 | 1.28:1 | 1.5 | 6 | 0.008 | No |
|  |  |  |  | 29 | 0.008 | No |
|  |  |  |  | 42 | 0.007 | No |
| 38 | 100:1 | 0.47:1 | 1.5 | 6 | 0.005 | No |
|  |  |  |  | 24 | 0.005 | No |
|  |  |  |  | 42 | 0.006 | No |
| 41 | 100:1 | 0.43:1 | 4.0 | 6 | 0.004 | No |
|  |  |  |  | 24 | 0.004 | No |
|  |  |  |  | 42 | 0.004 | No |
| 44 | 0:100 | 1.59:1 | 0.18 | 6 | 0.004 | No |
|  |  |  |  | 24 | 0.005 | No |

TABLE 13A

| Example | Grey Red | Solids Liquids | % sulphation | Type of tube | Pump Speed | Pump volume cc/sec | Time to Start of pressure build up T1 sec | Theoretical volume pumped to start of pressure build up | Total time to end of pressure increase | Time for which pressure applied T2-T1 secs | Pressure at shut off of valve |
|---|---|---|---|---|---|---|---|---|---|---|---|
| 51 | 100:0 | 0.49:1 | 16.7 | NW | 40 | 200 | — | — | 5 | 5 | 20 |
| 52 | 100:0 | 0.48:1 | 16.7 | NW | 20 | 150 | 4 | 600 | 6 | 2 | 22 |
| 53 | 100:0 | 0.48:1 | 16.7 | NW | 0 | 100 | — | — | 5-10 | — | 20 |
| 54 | 92:8 | 0.50:1 | 16.6 | NW | 0 | 100 | — | — | 5-10 | — | 20 |
| 55 | 84.5:15.5 | 0.52:1 | 16.1 | NW | 0 | 100 | — | — | 5-10 | — | 20 |
| 56 | 55.5:44.5 | 0.78:1 | 10.6 | NW | 0 | 100 | 5 | — | 7 | 2 | 20 |

TABLE 13B

| Example | Grey grams | Red grams | Water ml | Acid ml. | Wet paste in plate grams | Fltrate weight grams | % Settlement Sample | ½ life of Sample suspension | % Settlement of Filtrate | ½ life of filtrate suspension |
|---|---|---|---|---|---|---|---|---|---|---|
| 51 | 44737 | — | 90900 | 3500 | 270 | — | 73 | — | — | — |
| 52 | 43636 | — | 90900 | 3500 | 295 | — | — | — | — | — |
| 53 | 43048 | — | 90900 | 3500 | 293 | — | — | — | — | — |
| 54 | 41857 | 3630 | 90900 | 3500 | 305 | — | 72 | — | — | — |
| 55 | 39685 | 7250 | 90900 | 3500 | 309 | — | 72 | — | — | — |
| 56 | 39485 | 31645 | 90900 | 3500 | 356 | — | 66 | — | — | — |

TABLE 14

| Ex. | Grey Red | Solids Liquids | % Sulphation | Stratification Top D | middle C | B | bottom A | A - D | Mean | % deviation | 1 | 2 | 3 | 4 | Mean | Deviation |
|---|---|---|---|---|---|---|---|---|---|---|---|---|---|---|---|---|
| 42 | 100:1 | 0.42:1 | 4.0 | 230 | 240 | 244 | 243 | 13 |  |  |  |  |  |  |  |  |
| 43 | 0.100 | 1.63:1 | 0.07 | 262 | 262 | 270 | 261 | 1 | −1 |  |  |  |  |  |  |  |
| 50 | 18.6:81.4 | 1.59:1 | 0.72 | 258 | 250 | 248 | 258 | 0 |  |  |  |  |  |  |  |  |
| 51 | 100:0 | 0.49:1 | 16.7 | 39 | 47 | 47 | 43 | 4 | 44 | +7-11 | 32.5 | 28.5 | 27 | 25 | 28.25 | +15-12 |
| 52 | 100:0 | 0.48:1 | 16.7 | 43 | 67 | 63 | 55 | 12 | 57 | +10-24 | 37 | 36 | 35 | 35 | 35.75 | +3.5-2 |
| 53 | 100:0 | 0.48.1 | 16.7 | 41 | 63 | 61 | 56 | 15 | 55.25 | +15-26 | 36.5 | 36 | 34 | 31.5 | 34.5 | +6-9 |
| 54 | 92:8 | 0.50: | 16.6 | 38 | 46 | 65 | 65 | 27 | 53,5 | +23-29 | 35 | 37 | 37.5 | 33.5 | 35.75 | +5-6 |
| 55 | 84.5:15.5 | 0.52: | 16.1 | 46 | 53 | 64 | 65 | 19 | 57 | +14-19 | 41.5 | 42.5 | 41 | 36 | 40.25 | +6-10 |
| 56 | 55.5:44.5 | 0.78: | 10.6 | 57 | 70 | 83 | 84 | 32 | 74.75 | +20-24 | 55.5 | 55.5 | 56.5 | 52.5 | 55 | +3-4.5 |

TABLE 15-continued

| Example | Grey Red Oxide | Solids Liquids | % sulpha-tion | Rotating vane viscometer | | |
|---|---|---|---|---|---|---|
| | | | | Shear rate rpm | Torque lbs. ft | presence of peak |
| 47 | 9.9: 90.1 | 1.62:1 | 0.72 | 42 | 0.005 | No |
| | | | | 6 | 0.004 | No |
| | | | | 24 | 0.005 | No |
| | | | | 42 | 0.005 | No |
| 48 | 186: 81:9 | 1.68:1 | 0.72 | 6 | 0.004 | No |
| | | | | 24 | 0.004 | No |
| | | | | 42 | 0.004 | No |
| 51 | 100:0 | 0.49:1 | 16.7 | 6 | 0.005 | No |
| | | | | 24 | 0.005 | No |
| | | | | 42 | 0.005 | No |
| 54 | 92:8 | 0.50:1 | 16.6 | 6 | 0.006 | No |
| | | | | 24 | 0.004 | No |
| | | | | 42 | 0.004 | No |
| 55 | 84.5:15.5 | 0.52:1 | 16.1 | 6 | 0.007 | No |
| | | | | 24 | 0.005 | No |
| | | | | 42 | 0.005 | No |
| 56 | 55.5:44.5 | 0.78:1 | 10.6 | 6 | 0.006 | No |
| | | | | 24 | 0.005 | No |
| | | | | 42 | 0.005 | No |

FOOTNOTE:
As to the viscosity values see general statements under Table 4.

Comparison of the stratification results in Table 8 and Table 14 makes it clear that plates which are filtration filled (Table 14) have significantly lower degrees of stratification than plates which are injection filled (Table 8).

Notes on Tables 11A and 11B to 13A and 13B

1. % Sulphation. It has been assumed that all the acid is absorbed by and reacted with the excess oxide at the stage when it is first added and thus the % sulphation remains constant until more acid is added i.e. a proportion of the acid is removed with each sample of paste which is removed.

2. Solid/Liquid ratios. These are calculated including the whole of any acid added as liquid.

The effect of presulphation of the lead acid active material has been described with reference to three areas of the possible theoretical range of slurry compositions. These are 100% grey oxide with solids to liquids ratios of 1.3:1 to 0.4:1 and degrees of sulphation in the range 1.5 to 4.0% (Examples 34 to 42); 0:100 grey to red to 20:80 grey to red with solids to liquids ratios in the range 1.5:1 to 1.7:1 and degrees of sulphation in the range 0.05 to 0.8% (Examples 43 to 50); and 100:0 grey to red to 55: 45 grey to red with solids to liquids ratios in the range 0.4:1 to 0.8:1 and degrees of sulphation of 10 to 17% (Examples 51 to 56).

It is believed that there are many other formulations for presulphated lead acid active materials which will be effective to give filtration filling and the reader, with the teaching given herein, of the effect of acid on viscosity and the effect of variation of the ratio of solids to liquids, and of the effect of acid on viscosity and the effect of variation of grey oxide to red oxide ratio and the effect of variation in permeability of the porous envelope, will readily be able to select an appropriate formulation and an appropriate material for the porous envelope.

What I claim as our invention and desire to secure by Letters Patent is:

1. A method for preparing enveloped plates for batteries by introducing an active material composition containing liquids into the porous envelope of the plate, when the envelope is assembled on the current conducting element of the plate, characterized in that the active material of the composition is introduced into the envelope as an aqueous slurry, comprising a lead acid active material composition, which has a rotating vane viscometer torque value of less than 0.006 lbs. ft. at 20° C, said aqueous slurry being introduced into the envelope at a pressure of less than 5 p.s.i. until the envelope is filled with the composition, liquid issuing through the walls of the envelope, the pressure then being allowed to rise to a value above 5 p.s.i. but not in excess of 100 p.s.i. whereafter the pressure is released.

2. The method of claim 1 in which the envelope is an array of tubes arranged side by side with a current conducting element located in each tube.

3. The method of claim 1 in which the aqueous slurry comprises an aqueous blend of particulate active material and liquids, the weight ratio of the solids to the liquids being in the range 1:1 to 1.8:1.

4. The method of claim 1 in which the slurry has a density of less than 2.5 grams/cc.

5. The method of claim 1 in which after the envelope has filled the back pressure in the supply of slurry to the envelope is allowed to build up to a pressure in the range 5 to 50 psi.

6. The method of claim 1 in which the material of the envelope has a nitrogen permeability in the range 0.5 to 20 liters/sq.cm/min.

7. The method of claim 1 in which the active material is a lead acid active material which is at least partially sulphated before being introduced into the porous envelope of the plates.

8. The method of claim 1 in which the active material has an average particle size in the range 1 to 100 microns.

9. A tubular plate for a lead acid battery which is filled by the method of claim 1.

10. The method of claim 2 in which the ratio of the volume of slurry which is fed into the tubes to the total internal free volume of the tubes in the plate is at least 2:1.

11. The method of claim 10 in which said ratio is between 3:1 and 15:1.

12. The method of claim 5 in which the time over which the pressure is allowed to build up is from one-tenth of the time taken to fill the envelope up to a time equal to that taken to fill the envelope.

13. The method of claim 12 in which the envelope is filled in 5 to 15 seconds and the pressure is allowed to build up for 1 to 15 seconds.

14. The method of claim 12 in which the material of the envelope has a nitrogen permeability in the range 3 to 10 liters/sq.cm/minute.

15. The method of claim 10 in which the material of the envelope is a spun woven fabric having 15 to 25 weft threads per cm, 15 to 25 warp threads per cm and a nitrogen pereemability of 5 liters/sq.cm/minutes.

16. The method of claim 14 in which the material of the envelope is a non-woven batt of polyester fibres which is 0.5 to 0.7 mm thick, weighs 120 to 160 grams per sq cm, and has a nitrogen permeability of 8.0 liters/sq.cm/minute, and a water permeability of 1.5 liters/sq.cm/minute.

17. The method of claim 16 in which the slurry composition is non-acidified and contains grey lead oxide and red lead oxide in a range of ratios by weight of 66:34 to 33:67 and the weight ratio of solids to liquids is in the range 2.0:1 to 0.5:1.

18. The method of claim 17 in which said weight ratio of solids to liquids is in the range 1.5:1 to 0.7:1.

19. The method of claim 15 in which the slurry composition is non-acidified and contains grey lead oxide and red lead oxide in a range of ratios by weight of 66:34 to 33:67 and the weight ratio of solids to liquids is in the range 2.5:1 to 0.9:1.

20. The method of claim 7 in which the degree of sulphation of the active material is less than 17% by weight.

21. The method of claim 7 in which the active material is grey lead oxide and the degree of sulphation is up to 4% and the ratio of solids to liquids is in the range 1.3:1 to 0.4:1.

22. The method of claim 7 in which the active material is grey lead oxide containing up to 45% by weight of red lead oxide, the degree of sulphation is in the range 10% to 17% and the solids to liquids ratio is below 0.8:1.

23. The method of claim 7 in which the active material is red lead oxide, containing up to 20% by weight of grey lead oxide the degree of sulphation is up to 0.8% and the solids to liquids ratio is not more than 1.7:1.

24. The method of claim 20 in which the degree of sulphation of the active material is in the range 0.05 to 16.7%.

25. The method of claim 8 in which the active material has an average particle size in the range 5 to 20 microns.

26. A method for filling enveloped plates for batteries which comprises introducing an active material composition into the porous envelope of the plate when the envelope is assembled on the current conducting element of the plate, characterized in that the active material composition is introduced into the envelope as an aqueous slurry, comprising a lead acid active material composition, which has a rotating vane viscometer torque value of less than 0.006 lbs. ft. at 20° C, said aqueous slurry being introduced into the envelope at a pressure of less than 5 p.s.i. until the envelope is filled with the composition, liquid issuing through the walls of the envelope, the pressure then being allowed to rise to a value above 5 p.s.i. but not in excess of 100 p.s.i. whereafter the pressure is released; wherein the envelope is disposed in a substantially vertical plane so that solids can settle to the bottom of the envelope under gravity, the aqueous slurry containing a ratio of active material to water in the range 0.4:1 to 2.5:1 in parts by weight, the material of the envelope being selected to filter out active material whilst allowing passage of liquids; the solids being at least partially retained within the envelope and the liquids at least partially passing out through the walls of the envelope.

27. The method of claim 26 in which the envelope is clamped at the top and bottom whilst the slurry is introduced into the tubes so that the liquids can escape out from the whole area of the envelope.

28. The method of claim 26 in which a supply of the slurry composition is continuously mixed during the filling and a minor proportion of the slurry supply is introduced from this continuously mixed supply into each envelope plate.

29. The method of claim 26 in which the supply of slurry composition is delivered by a pump to a filling manifold, which feeds a plate from an agitated supply of slurry in a storage tank, the said pump being one which gives smooth delivery and maintains the slurry in suspension, and the slurry, in the intervals between introduction into an enveloped plate via the filling manifold, is recirculated from the outlet of the pump, via a recirculating tube connected to the pump outlet, to the storage tank, and thence, via a supply tube, to the pump inlet.

30. The method of claim 28 in which the weight ratio of the active material in the continuously mixed slurry supply to the individual filling weight is in the range 1300:1 to 25:1.

* * * * *